(12) United States Patent
Takahashi et al.

(10) Patent No.: US 10,135,074 B2
(45) Date of Patent: Nov. 20, 2018

(54) CARBON POWDER FOR CATALYST, CATALYST, ELECTRODE CATALYST LAYER, MEMBRANE ELECTRODE ASSEMBLY, AND FUEL CELL USING THE CARBON POWDER

(71) Applicant: NISSAN MOTOR CO., LTD., Yokohama-shi, Kanagawa (JP)

(72) Inventors: Shinichi Takahashi, Kanagawa (JP); Atsushi Ohma, Kanagawa (JP); Tetsuya Mashio, Kanagawa (JP); Ken Akizuki, Kanagawa (JP)

(73) Assignees: NISSAN MOTOR CO., LTD., Yokohama-shi (JP); NIPPON STEEL & SUMIKIN CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/025,354

(22) PCT Filed: Sep. 9, 2014

(86) PCT No.: PCT/JP2014/073813
§ 371 (c)(1),
(2) Date: Mar. 28, 2016

(87) PCT Pub. No.: WO2015/045852
PCT Pub. Date: Apr. 2, 2015

(65) Prior Publication Data
US 2016/0233520 A1 Aug. 11, 2016

(30) Foreign Application Priority Data
Sep. 30, 2013 (JP) .................................. 2013-204163

(51) Int. Cl.
*H01M 4/92* (2006.01)
*H01M 4/86* (2006.01)
(Continued)

(52) U.S. Cl.
CPC ............. *H01M 4/926* (2013.01); *B01J 21/18* (2013.01); *H01M 4/8673* (2013.01);
(Continued)

(58) Field of Classification Search
None
See application file for complete search history.

(56) References Cited

U.S. PATENT DOCUMENTS 5,869,922 A 2/1999 Tolt
2003/0179537 A1 9/2003 Tanaka et al.
(Continued)

FOREIGN PATENT DOCUMENTS

JP 2003-109614 A 4/2003
JP 2004-149399 A 5/2004
(Continued)

OTHER PUBLICATIONS

Isaac Childres, Luis A. Jauregui, Wonjun Park, Helin Cao and Yong P. Chen, "Raman Spectroscopy of Graphene and Related Materials", "New Developments in Photon and Materials Research", ed. J. I. Jang, Nova Science Publishers (Jul. 2013).*
(Continued)

*Primary Examiner* — Rena Dye Cronin
(74) *Attorney, Agent, or Firm* — Foley & Lardner LLP

(57) ABSTRACT

The present invention is to provide a carbon powder that can provide a catalyst having excellent durability and a catalyst. A carbon powder for catalyst of the present invention is a carbon powder containing as a main component carbon, which has a BET specific surface area per unit weight of 900 $m^2/g$ or greater, and a ratio R' (D'/G intensity ratio) of peak intensity for a D'-band (D' intensity) measured in the vicinity of 1620 $cm^{-1}$ to peak intensity for a G-band (G intensity) measured in the vicinity of 1580 $cm^{-1}$ by Raman spectroscopy of 0.6 or less.

9 Claims, 3 Drawing Sheets

(51) Int. Cl.
*H01M 4/90* (2006.01)
*B01J 21/18* (2006.01)
*B01J 23/40* (2006.01)
*B01J 35/10* (2006.01)
*H01M 8/1004* (2016.01)
*C01B 31/00* (2006.01)
*B01J 35/00* (2006.01)
*B01J 37/08* (2006.01)
*H01M 8/1018* (2016.01)

(52) U.S. Cl.
CPC ....... *H01M 4/9083* (2013.01); *H01M 8/1004* (2013.01); *B01J 23/40* (2013.01); *B01J 35/0033* (2013.01); *B01J 35/108* (2013.01); *B01J 35/1028* (2013.01); *B01J 35/1042* (2013.01); *B01J 35/1057* (2013.01); *B01J 35/1061* (2013.01); *B01J 37/08* (2013.01); *C01B 31/00* (2013.01); *C01P 2006/12* (2013.01); *H01M 2008/1095* (2013.01)

(56) References Cited

U.S. PATENT DOCUMENTS

| | | | | |
|---|---|---|---|---|
| 2004/0121220 A1* | 6/2004 | Ikoma | ................... | H01M 4/926 429/480 |
| 2007/0211411 A1 | 9/2007 | Tanaka et al. | | |
| 2009/0233135 A1 | 9/2009 | Horiuchi et al. | | |
| 2010/0075835 A1* | 3/2010 | Yuge | ................... | B01J 21/185 502/150 |
| 2011/0014111 A1* | 1/2011 | Leugers | ................ | B82Y 30/00 423/415.1 |
| 2011/0045347 A1* | 2/2011 | Liu | ...................... | H01M 4/366 429/209 |
| 2011/0058308 A1* | 3/2011 | Nishi | .................... | B82Y 30/00 361/503 |
| 2011/0182001 A1 | 7/2011 | Tanaka et al. | | |
| 2011/0287336 A1* | 11/2011 | Himeno | .............. | H01M 8/0213 429/492 |
| 2011/0318254 A1* | 12/2011 | Morishita | .............. | B82Y 30/00 423/445 R |
| 2013/0288155 A1* | 10/2013 | Kim | ..................... | H01M 4/926 429/483 |
| 2014/0170528 A1* | 6/2014 | Monden | .................. | H01M 4/88 429/482 |
| 2014/0255803 A1* | 9/2014 | Ng | ...................... | H01M 4/8615 429/406 |
| 2015/0030966 A1* | 1/2015 | Shimoi | .................. | H01M 4/926 429/524 |
| 2015/0104372 A1* | 4/2015 | Lin | ......................... | C01B 31/08 423/460 |
| 2015/0240707 A1 | 8/2015 | Wang et al. | | |

FOREIGN PATENT DOCUMENTS

| | | | | |
|---|---|---|---|---|
| JP | 2005-026174 A | | 1/2005 | |
| JP | 2008105922 | * | 5/2008 | ............. C01B 31/02 |
| JP | 2008-153694 A | | 7/2008 | |
| WO | WO 2007/055411 A1 | | 5/2007 | |
| WO | WO 2013/129417 A1 | | 9/2013 | |
| WO | WO 2014/123213 A1 | | 8/2014 | |

OTHER PUBLICATIONS

Isaac Childres, Luis A. Jauregui, Wonjun Park, Helin Cao and Yong P. Chen, "Raman Spectroscopy of Graphene and Related Materials," "New Developments in Photon and Materials Research", ed. J.I. Jang, Nova Science Publishers (Jul. 2013) https://www.amazon.com/s/ref=dp_byline_sr_book_1?ie=UTF8&field-author=Joon+I.+Jang&search-alias=books&text=Joon+I.+Jang&sort=relevancerank (2013) https://www.novapublishers.com/catalog/product_info.php?products_id=40369 (See Table of Contents—Chapter 19); https://www.physics.purdue.edu/quantum/files/Raman_Spectroscopy_of_Graphene_NOVA_Childres.pdf; https://www.physics.purdue.edu/quantum/publications.php (PDF document link found under 2013 Book Chapters).*

A. Sadezky et al., Raman Microspectroscopy of Soot and Related Carbonaceous Materials: Spectral Analysis and Structural Information, Carbon 43, 2005, pp. 1731-1742.

European Office Action, Application No. 14 848 927.1, dated May 17, 2017, 4 pages.

Mitsuyoshi Muraoka et al., Iron Addition to Vietnam Anthracite Coal and its Nitrogen Doping as a PEFC Non-Platinum Cathode Catalyst, Fuel, May 29, 2012, vol. 102, pp. 359-365.

* cited by examiner

CARBON POWDER FOR CATALYST, CATALYST, ELECTRODE CATALYST LAYER, MEMBRANE ELECTRODE ASSEMBLY, AND FUEL CELL USING THE CARBON POWDER

TECHNICAL FIELD

The present invention relates to a carbon powder for catalyst, and more particularly, to a carbon powder for catalyst used in a fuel cell, a catalyst using the carbon powder for catalyst, an electrode catalyst layer, a membrane electrode assembly, and a fuel cell.

BACKGROUND ART

A polymer electrolyte fuel cell using a proton conductive solid polymer membrane operates at a low temperature in comparison to other types of fuel cells, for example, a solid oxide fuel cell or a molten carbonate fuel cell. For this reason, the polymer electrolyte fuel cell has been expected to be used as a power source for energy storage system or a driving power source for a vehicle such as a car, and practical uses thereof have been started.

In general, expensive metal catalysts such as Pt (platinum) and Pt alloys have been used for such a polymer electrolyte fuel cell. Also graphitized carbon has been used as a support for supporting a metal catalyst in terms of water repellency and corrosion resistance. For example, Patent Literature 1 discloses a technique using a support having an average lattice spacing of (002) plane, $d_{002}$, of 0.338 to 0.355 nm, a specific surface area of 80 to 250 $m^2$/g, and a bulk density of 0.30 to 0.45 g/ml. Patent Literature 1 discloses that durability can be improved by using the graphitized support.

CITATION LIST

Patent Literature

Patent Literature 1: JP 2005-26174 A

SUMMARY OF INVENTION

Problem to be Solved by the Invention

In the support disclosed in the Patent Literature 1, however, since the support has excellent durability but small specific surface area, there has been a problem in terms of decreased activity over time.

Accordingly, the present invention has been made in light of the aforementioned circumstances and aims at providing a carbon powder for catalyst which can suppress the decrease in catalytic activity while maintaining durability of support.

Another object of the present invention is to provide a catalyst, an electrode catalyst layer, a membrane electrode assembly, and a fuel cell which are excellent in durability and power generation performance.

Means to Solve the Problem

The present inventors have intensively studied to solve the aforementioned problems, to find that the problems can be solved by using as a support a carbon powder for catalyst having a specified specific surface area and a D/G intensity ratio, and eventually the present invention has been completed.

BRIEF DESCRIPTION OF DRAWINGS

In FIG. 1, reference sign 1 represents a polymer electrolyte fuel cell (PEFC); reference sign 2 represents a solid polymer electrolyte membrane; reference sign 3a represents an anode catalyst layer; reference sign 3c represents a cathode catalyst layer; reference sign 4a represents an anode gas diffusion layer; reference sign 4c represents a cathode gas diffusion layer; reference sign 5a represents an anode separator; reference sign 5c represents a cathode separator; reference sign 6a represents an anode gas passage; reference sign 6c represents a cathode gas passage; reference sign 7 represents a coolant passage; and reference sign 10 represents a membrane electrode assembly (MEA).

In FIG. 2, reference sign 20 represents a catalyst; reference sign 22 represents a catalyst metal; reference sign 23 represents a support; reference sign 24 represents a mesopore; and reference sign 25 represents a micropore.

In FIG. 3, reference sign 22 represents a catalyst metal; reference sign 23 represents a support; reference sign 24 represents a mesopore; reference sign 25 represents a micropore; and reference sign 26 represents an electrolyte.

DESCRIPTION OF EMBODIMENTS

Figure 1:
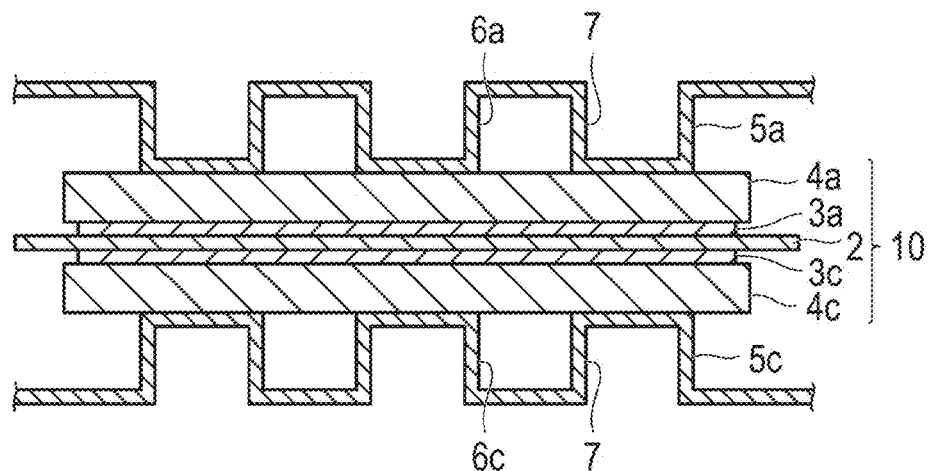
FIG. 1 is a cross-sectional view schematically illustrating a basic configuration of a polymer electrolyte fuel cell according to an embodiment of the present invention.

A carbon powder for catalyst (simply also referred to as a "carbon powder" in this description) of the present invention contains carbon as a main component. As used herein, the phrase "contain(s) carbon as a main component" includes both "consist(s) only of carbon" and "consist(s) substantially of carbon", and an element other than carbon may be incorporated. The phrase "consist(s) substantially of carbon" means that 80 wt % or more, preferably 95 wt % or more (upper limit: less than 100 wt %) of the entire carbon power is composed of carbon.

The carbon powder for catalyst of the present invention satisfies the following configurations (a) and (b):

(a) a BET specific surface area per unit weight is 900 $m^2$/g or greater; and (b) a ratio R' (D'/G intensity ratio) of peak intensity for a D'-band (D' intensity) measured in the vicinity of 1620 $cm^{-1}$ to peak intensity for a G-band (G intensity) measured in the vicinity of 1580 $cm^{-1}$ by Raman spectroscopy is 0.6 or less. In this description, a G-band measured in the vicinity of 1580 $cm^{-1}$ by the Raman spectroscopy is also simply referred to as a "G-band". In this description, a D'-band measured in the vicinity of 1620 cm$^{-1}$ by the Raman spectroscopy is also simply referred to as a "D'-band". In addition, peak intensity for G-band and D'-band is also simply referred to as "G intensity" and "D' intensity", respectively. Moreover, a ratio of D' intensity to G intensity is also simply referred to as an "R' value" or a "D'/G intensity ratio". In the carbon powder for catalyst having the above configuration, a specific surface area is large and an edge quantity serving as a starting point of electrochemical corrosion is small. For this reason, by using the carbon powder for catalyst of the present invention as a support, a catalyst that is excellent in durability and can maintain catalytic activity can be provided.

The support disclosed in the Patent Literature 1 can be obtained by graphitization of carbon particles through heat treatment at 2000 to 3000° C. (see paragraph [0016]). The support disclosed in the Patent Literature 1 can improve its durability by the graphitization treatment. However, since the support has a small specific surface area as of 250 m$^2$/g or less, a coating ratio of a catalyst metal (for example, platinum) with an electrolyte in the formation of an electrode catalyst layer is high. For this reason, gas transport ability of the electrode catalyst layer is decreased, to lower activity.

In contrast, the carbon powder according to the present invention satisfies the configuration (a) described above. Since the carbon powder has a sufficient specific surface area due to the configuration (a), electrical double layer capacitance is large. In addition, the carbon powder according to the present invention satisfies the configuration (b) described above. The G-band is a peak resulting from graphite (oscillation in a hexagonal lattice of a carbon atom) observed in the vicinity of 1580 cm$^{-1}$ by Raman scattering analysis. The D'-band is observed as a shoulder of the G-band in the vicinity of 1620 cm$^{-1}$ by Raman scattering analysis. This D'-band results from disturbance (disorder) or defect of a graphite structure, and appears when a crystal size of graphite is small or numerous edges of graphene sheet exist. An electronic state of the edge (end) of a graphene molecule is likely to be a starting point of carbon corrosion, unlike a center (six-membered ring) of a graphene molecule. That is, a small R' value indicates that an edge quantity of carbon (graphene) existing in a graphite structure and serving as a starting point of electrochemical corrosion is small. Therefore, durability can be improved due to the above configuration (b), and thus deterioration in catalytic activity can be effectively suppressed and prevented.

In addition, the carbon powder according to the present invention preferably has a configuration (c) that a ratio R (D/G intensity ratio) of peak intensity (D intensity) for a D-band measured in the vicinity of 1360 cm$^{-1}$ to G intensity is 1.7 or more. In this description, a D-band observed in the vicinity of 1360 cm$^{-1}$ by Raman spectroscopy is also simply referred to as a "D-band". In addition, peak intensity for the D-band is also referred to as "D intensity". Moreover, a ratio of D intensity to G intensity is also simply referred to as an "R value" or a "D/G intensity ratio". Herein, the D-band is observed in the vicinity of 1360 cm$^{-1}$ by Raman scattering analysis, results from disturbance (disorder) or defect of a graphite structure, and appears when orientation of graphene molecules is high or a graphitization degree is high. That is, a large R value indicates that a graphitization degree of a carbon powder (support) is low. Therefore, by the above configuration (c), electrical double layer capacitance per surface area of the carbon powder increases, to improve catalytic activity more effectively.

The G-band, D'-band, and D-band, and peak intensities for these bands have been well known in the art. For example, see R. Vidano and D. B Fischbach, J. Am. Ceram. Soc. 61 (1978) 13-17 or G. Katagiri, H. Ishida and A. Ishitani, Carbon 26 (1988) 565-571.

Therefore, the carbon powder for catalyst of the present invention has excellent durability and can exhibit and maintain high catalytic activity when a catalyst metal is supported thereon. For this reason, the carbon powder for catalyst of the present invention can be suitably used for a catalyst, particularly, as a support of a catalyst used for fuel cell. That is, the present invention involves a catalyst comprising a catalyst metal supported on the carbon powder for catalyst of the present invention. The carbon powder for catalyst (support) of the present invention has a high specific surface area. Therefore, according to the catalyst of the present invention, dispersability of the catalyst can be improved, to increase an electrochemical reaction area, i.e., to improve power generation performance. In addition, the carbon powder for catalyst (support) of the present invention has a small carbon edge quantity. Therefore, according to the catalyst of the present invention, performance degradation due to carbon corrosion can be suppressed and prevented, that is, durability can be improved. A catalyst having a catalyst metal supported on the carbon powder for catalyst of the present invention can have excellent durability, exhibit and maintain high catalytic activity (to facilitate catalyst reaction). Thus, a membrane electrode assembly and a fuel cell having a catalyst layer using such a catalyst have excellent power generation performance and durability. Accordingly, the present invention provides an electrode catalyst layer for fuel cell including the catalyst and an electrolyte, a membrane electrode assembly for fuel cell including the electrode catalyst layer for fuel cell, and a fuel cell including the membrane electrode assembly for fuel cell.

Hereinafter, embodiments of a catalyst according to the present invention and embodiments of a catalyst layer, and a membrane electrode assembly (MEA) and a fuel cell using the catalyst will be described in detail appropriately with reference to the drawings. However, the present invention is not limited to the following embodiments. In addition, figures may be expressed in an exaggerated manner for the convenience of description, and in the figures, scaling factors of components may be different from actual values thereof. In addition, in the description of the embodiments of the present invention with reference to the drawings, the same components are denoted by the same reference numerals, and redundant description is omitted.

In this description, "X to Y" representing a range denotes "X or more and Y or less". Unless otherwise noted, operation and the measurement of physical properties are performed at a room temperature (20 to 25° C.) and a relative humidity of 40 to 50%.

[Fuel Cell]

A fuel cell comprises a membrane electrode assembly (MEA) and a pair of separators including an anode-side separator having a fuel gas passage through which a fuel gas flows and a cathode-side separator having an oxidant gas passage through which an oxidant gas flows. The fuel cell according to the present embodiment has excellent durability and can exhibit a high power generation performance.

FIG. 1 is a schematic diagram illustrating a basic configuration of a polymer electrolyte fuel cell (PEFC) 1 according to an embodiment of the present invention. First, a PEFC 1 is configured to comprise a solid polymer electrolyte membrane 2 and a pair of catalyst layers (anode catalyst layer 3a and cathode catalyst layer 3c) interposing the solid polymer electrolyte membrane 2. A stacked body of the solid polymer electrolyte membrane 2 and the catalyst layers (3a, 3c) is sandwiched by a pair of gas diffusion layers (GDLs) (anode gas diffusion layer 4a and cathode gas diffusion layer 4c). In this manner, the solid polymer electrolyte membrane 2, a pair of the catalyst layers (3a, 3c), and a pair of gas diffusion layers (4a, 4c) in the stacked state constitute a membrane electrode assembly (MEA) 10.

In the PEFC 1, the MEA 10 is sandwiched by a pair of separators (anode separator 5a and cathode separator 5c). In FIG. 1, the separators (5a, 5c) are illustrated to be positioned at two ends of the MEA 10 illustrated. In general, in a fuel cell stack where a plurality of MEAs are stacked, the separator is also used as a separator for adjacent PEFC (not shown). In other words, MEAs in a fuel cell stack are sequentially stacked through the separator to constitute the stack. In an actual fuel cell stack, a gas sealing member is disposed between the separators (5a, 5c) and the solid polymer electrolyte membrane 2 and between the PEFC 1 and a different PEFC adjacent thereto. However, it is omitted in FIG. 1.

The separators (5a, 5c) are obtained by applying a pressing process to a thin board having a thickness of, for example, 0.5 mm or less to form a corrugating shape illustrated in FIG. 1. Convex portions of the separators 5a and 5c seen from the MEA side are in contact with the MEA 10. This secures an electrical connection with the MEA 10. Concave portions (spaces between the separator and the MEA formed by the corrugating shapes of the separators) of the separators (5a and 5c) seen from the MEA side function as a gas passage for passing a gas during the operation of the PEFC 1. Specifically, a fuel gas (for example, hydrogen) flows through a gas passage 6a of the anode separator 5a, and an oxidant gas (for example, air) flows through a gas passage 6c of the cathode separator 5c.

On the other hand, concave portions of the separators (5a, 5c) seen from the side opposite to the MEA side function as a coolant passage 7 for passing a coolant (e.g. water) for cooling the PEFC during the operation of the PEFC 1. In addition, manifolds (not shown) are typically installed in the separators. The manifold functions as a connecting means for connecting cells when the stack is configured. According to the configuration, a mechanical strength of the fuel cell stack can be secured.

In the embodiment illustrated in FIG. 1, each of the separators (5a, 5c) is formed in a corrugating shape. However, the separator is not limited to such a corrugating shape. If it can serve as a gas passage and a coolant passage, arbitrary shape such as a flat shape and a partially corrugating shape may be employed.

The fuel cell including the MEA according to the present invention as described above has excellent performance of power generation and durability. Herein, the type of the fuel cell is not particularly limited. In the above description, the polymer electrolyte fuel cell is exemplified, but besides, an alkali fuel cell, a direct methanol fuel cell, a micro fuel cell, and the like may be exemplified. Among the fuel cells, due to a small size and capability of obtaining high density and high power, a polymer electrolyte fuel cell (PEFC) is preferred. In addition, the fuel cell is useful as a power source for energy storage system besides a power source for a vehicle such as a car where a mounting space is limited. Among the power sources, the fuel cell is particularly preferably used as a power source for a vehicle such as a car where a high output voltage is required after the stopping of operation for a relatively long time.

A fuel used for operating the fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, diethylene glycol, or the like can be used. Among them, in view of capability of high output, hydrogen or methanol is preferably used.

In addition, although application use of the fuel cell is not particularly limited, the fuel cell is preferably applied to vehicles. The electrolyte membrane-electrode assembly according to the present invention has excellent power generation performance and durability, and can be downsized. Therefore, in terms of mountability on a vehicle, the fuel cell according to the present invention is particularly advantageous in the case where the fuel cell is applied to a vehicle.

Hereinafter, members constituting the fuel cell according to the present invention will be described in brief, but the scope of the present invention is not limited only to the following forms.

[Catalyst (Electrode Catalyst)]

A catalyst (electrode catalyst) is composed of a carbon powder (support) and a catalyst metal supported on the carbon powder. The carbon powder (support) satisfies the following configurations (a) and (b):

(a) it has a BET specific surface area per unit weight of 900 $m^2/g$ or greater; and (b) it has a ratio R' (D'/G intensity ratio) of D' intensity to G intensity of 0.6 or less.

Since the carbon powder has a sufficient specific surface area due to the configuration (a), large electrical double layer capacitance can be attained. For this reason, a catalyst having a catalyst metal supported on the carbon powder satisfying the configuration (a) can exhibit high activity. On the other hand, when a BET specific surface area per unit weight of a carbon powder is less than 900 $m^2/g$, a coating ratio of a catalyst with an electrolyte in the formation of an electrode catalyst layer by using a catalyst having a catalyst metal supported on the carbon powder increases due to its small specific surface area. For this reason, gas transport ability in the electrode catalyst layer is lowered to decrease activity. In view of further improvement of electrical double layer capacitance, the BET specific surface area of the carbon powder is preferably 1000 to 3000 $m^2/g$, and more preferably 1100 to 1800 $m^2/g$.

In this description, the "BET specific surface area ($m^2/g$ support)" is measured by a nitrogen adsorption method. Specifically, about 0.04 to 0.07 g of a sample (carbon powder or catalyst powder) is accurately weighed and sealed in a sample tube. The sample tube is preliminarily dried in a vacuum drier at 90° C. for several hours, to obtain a sample for measurement. For the weighing, an electronic balance (AW220) produced by Shimadzu Co., Ltd. is used. In the case of a coated sheet, about 0.03 to 0.04 g of a net weight of a coat layer obtained by subtracting a weight of Teflon (registered trademark) (substrate) having the same area from a total weight of the coated sheet is used as a sample weight. Next, under the following measurement conditions, a BET specific surface area is measured. In an adsorption side of adsorption and desorption isotherms, a BET plot is produced from a relative pressure (P/P0) range of about 0.00 to 0.45, and a BET specific surface area is calculated from the slope and the intercept.

[Chem. 1]
<Measurement Conditions>
Measurement Apparatus: BELSORP 36, High—Precise Automatic Gas Adsorption Apparatus produced by BEL Japan, Inc.
Adsorption Gas: $N_2$
Dead Volume Measurement Gas: He
Adsorption Temperature: 77 K (Liquid Nitrogen Temperature)
Measurement Preparation: Vacuum Dried at 90° C. for several hours (After He Purging, Set on Measurement Stage)
Measurement Mode: Adsorption Process and Desorption Process in Isotherm
Measurement Relative Pressure $P/P_0$: about 0 to 0.99
Equilibrium Setting Time: 180 sec for 1 relative pressure In addition, the configuration (b) can sufficiently reduce an edge quantity of carbon (graphene) which exists in a graphite structure and serves as a starting point of electrochemical corrosion. Therefore, when such a carbon powder is used in a catalyst, durability can be improved, and decrease in catalytic activity in the support of a catalyst metal thereon can effectively suppressed and prevented. In view of further improvement of the durability, the R' value (D'/G intensity ratio) of the carbon powder is preferably 0 to 0.6, and more preferably 0 to 0.51.

In addition, the carbon powder according to the present invention preferably has a configuration (c) that a ratio R (D/G intensity ratio) of D intensity to G intensity is 1.7 or more. Since such a carbon powder (support) has a low graphitization degree, electrical double layer capacitance per surface area of the carbon powder increases, and catalytic activity can be more effectively improved. In view of further improvement of electrical double layer capacitance (catalytic activity), the R value (D/G intensity ratio) of the carbon powder is preferably more than 1.75 and 2.5 or less, and more preferably 1.8 to 2.4.

In this description, the R' value can be determined by obtaining a Raman spectrum of a carbon material with a Micro-Raman spectroscope, and calculating a relative intensity ratio between peak intensity in the vicinity of 1620 $cm^{-1}$ called a D'-band (D' intensity) and peak intensity in the vicinity of 1580 $cm^{-1}$ called a G-band (G intensity), that is, a peak area ratio (D' intensity/G intensity). Similarly, the R value can be determined by obtaining a Raman spectrum of a carbon material with a Micro-Raman spectroscope, and calculating a relative intensity ratio between peak intensity in the vicinity of 1360 $cm^{-1}$ called a D-band (D intensity) and peak intensity in the vicinity of 1580 $cm^{-1}$ called a G-band (G intensity), that is, a peak area ratio (D intensity/G intensity). The peak area is obtained by Raman spectroscopic measurement to be described below.
(Raman Spectroscopic Measurement Method)
A Raman spectrum is obtained using micro laser Raman SENTERRA (manufactured by Bruker Optics) as a measurement apparatus at a room temperature (25° C.) for an exposure time of 30 seconds by four times as a cumulated number under the following conditions. Peaks of G-band, D'-band, and D-band can be determined by peak fitting with Gauss distribution.
[Chemical Formula 2]
<Measurement Conditions>
Excitation wavelength: Nd: SHG of YAG, 532 nm
Laser output: 3 mW
Spot size: 1 µm or less
Detector: CCD A size of the carbon powder is not particularly limited. From a viewpoint of easy supporting, utilization rate of a catalyst, and controllability of a thickness of an electrode catalyst layer within an adequate range, an average particle size (diameter) of the carbon powder is preferably in the approximate range of 5 to 2000 nm, more preferably 10 to 200 nm, and particularly preferably 20 to 100 nm. As a value of the "average particle size of the carbon powder", unless otherwise noted, a value calculated as an average value of particle diameters of particles observed within several or several tens of fields by using observation means such as a scanning electron microscope (SEM) or a transmission electron microscope (TEM) is employed. In addition, the "particle size (diameter)" denotes a maximum distance among distances between arbitrary two points on an outline of a particle.

As long as the carbon powder satisfies the configurations (a) and (b) described above, and particularly preferably satisfies the configurations (a), (b), and (c), the structure of the carbon powder is not particularly limited. Preferably, the carbon powder further satisfies the following configurations (i) and (ii):

(i) the carbon powder contains pores (primary pores) having a radius of less than 1 nm and pores (primary pores) having a radius of 1 nm or more; and (ii) a pore volume of pores having a radius of less than 1 nm is 0.3 cc/g-support or more.

Alternatively, it is preferred that the carbon powder further satisfies the following configurations (i) and (iv):

(i) the carbon powder contains pores having a radius of less than 1 nm and pores having a radius of 1 nm or more; and (iv) a mode radius of pore distribution of pores having a radius of less than 1 nm is 0.3 nm or more and less than 1 nm.

In this description, a pore having a radius of less than 1 nm is also referred to as "micropore". Also, in this description, a pore having a radius of 1 nm or more is referred to as "mesopore".

By the configuration (ii) described above, a sufficient pore volume of micropores which a little or no electrolyte or catalyst metal can enter can be attained. By the configuration (iv) described above, a mode diameter of micropores can be set to be large. For this reason, a gas transport path can be sufficiently secured in a catalyst having the catalyst metal supported on such a carbon powder. Accordingly, a gas such as oxygen can be efficiently transported to a catalyst metal existing in the mesopores. That is, gas transport resistance can be reduced. By the configuration, a gas (for example, oxygen) passes through the micropores (to improve gas transport ability), to efficiently contact with the catalyst.

Alternatively, it is preferred that the carbon powder further satisfies the above configurations (i), (ii), and (iv).

In the above configuration (ii), in view of effect of improving gas transportability, the pore volume of micropores is more preferably in the range of 0.3 to 2 cc/g-support, further more preferably in the range of 0.4 to 1.5 cc/g-support, and particularly preferably in the range of 0.4 to 1.0 cc/g-support. In the above configuration (iv), the mode radius of pore distribution of micropores is more preferably in the range of 0.4 to 1 nm, and particularly preferably in the range of 0.5 to 0.8 nm. When the pore volume and/or mode diameter of micropores is within the range as described above, sufficient micropores to transport a gas can be secured, and gas transport resistance can be small. Therefore, since a sufficient amount of gas can be transported to a surface of catalyst metal existing in a mesopore(s) through a micropore(s) (path), a catalyst using the carbon powder according to the present invention can exhibit a higher catalytic activity, and namely, catalyst reaction can be more efficiently facilitated. In addition, an electrolyte (ionomer) or liquid (for example, water) cannot enter a micropore, and only a gas can selectively pass through the micropore(s) (gas transport resistance can be reduced). In this description, a pore volume of pores having a radius of less than 1 nm is also simply referred as a "pore volume of micropores". Similarly, in this description, a mode radius of a pore distribution of micropores is also simply referred to as a "mode diameter of micropores".

In addition, a pore volume of pores (mesopores) having a radius of 1 nm or more of the carbon powder is not particularly limited, but it is preferably 0.4 cc/g-support or more, more preferably in the range of 0.4 to 3 cc/g-support, further more preferably in the range of 0.4 to 1.5 cc/g-support, and particularly preferably in the range of 0.5 to 1.2 cc/g-support. When the pore volume is within the range as described above, a larger number of catalyst metals can be placed (supported) in the mesopores of the carbon powder, an electrolyte and a catalyst metal in a catalyst layer can be physically separated from each other (contact between catalyst metals and an electrolyte can be more effectively suppressed and prevented). Therefore, a catalyst using such a carbon powder can more effectively use activity of the catalyst metal. Also, due to existence of a large number of mesopores, the function and effects by the present invention can be further remarkably exhibited, so that catalyst reaction can be more effectively facilitated. In addition, a micropore(s) functions as a gas transport path, and thus, a three-phase boundary with water is more remarkably formed, so that catalytic activity can be more improved. In this description, a pore volume of pores having a radius of 1 nm or more is simply referred to as a "pore volume of the mesopores".

A mode radius (mode diameter) of a pore distribution of pores (mesopores) having a radius of 1 nm or more of the carbon powder is not particularly limited, but it is preferably in the range of 1 to 5 nm, more preferably in the range of 1 to 4 nm, and particularly preferably in the range of 1 to 3 nm. When the mode diameter of pore distribution of mesopores is within the range as described above, since a sufficient amount of catalyst metals can be placed (supported) in the mesopores of the carbon powder, an electrolyte and a catalyst metal in a catalyst layer can be physically separated from each other (contact between catalyst metals and an electrolyte can be more effectively suppressed and prevented). Therefore, a catalyst using such a carbon powder can more effectively use activity of the catalyst metal. Also, due to existence of a large volume of mesopores, the function and effects by the present invention can be further remarkably exhibited, so that catalyst reaction can be more effectively facilitated. In addition, a micropore(s) functions as a gas transport path, and thus, a three-phase boundary with water is more remarkably formed, so that catalytic activity can be more improved. In this description, a mode radius of a pore distribution of mesopores is also simply referred to as a "mode diameter of the mesopores".

The "pore radius (nm) of micropores" denotes a radius of pores measured by a nitrogen adsorption method (MP method). In addition, the "mode radius (nm) of a pore distribution of micropores" denotes a pore radius at a point taking a peak value (maximum frequency) in a differential pore distribution curve obtained by a nitrogen adsorption method (MP method). Herein, a lower limit of the pore radius of micropores is a lower limit value which can be measured by the nitrogen adsorption method, that is, 0.42 nm or more. Similarly, the "pore radius (nm) of mesopores" denotes a radius of pores measured by a nitrogen adsorption method (DH method). In addition, the "mode radius (nm) of a pore distribution of mesopores" denotes a pore radius at a point taking a peak value (maximum frequency) in a differential pore distribution curve obtained by a nitrogen adsorption method (DH method). Herein, an upper limit of the pore radius of mesopores is not particularly limited, but it is 5 nm or less.

The "pore volume of micropores" denotes a total volume of micropores having a radius of less than 1 nm existing in a carbon powder, and is expressed by volume per 1 g of support (cc/g support). The "pore volume (cc/g support) of micropores" is calculated as an area (integration value) under a differential pore distribution curve obtained according to a nitrogen adsorption method (MP method). Similarly, the "pore volume of mesopores" denotes a total volume of mesopores having a radius of 1 nm or more existing in a carbon powder, and is expressed by volume per 1 g of support (cc/g support). The "pore volume (cc/g support) of mesopores" is calculated as an area (integration value) under a differential pore distribution curve obtained according to a nitrogen adsorption method (DH method).

The "differential pore distribution" is a distribution curve obtained by plotting a pore diameter in the horizontal axis and a pore volume corresponding to the pore diameter in a carbon powder in the vertical axis. Namely, when a pore volume of a carbon powder obtained by a nitrogen adsorption method (MP method in case of the micropores; and DH method in case of the mesopores) is denoted by V and a pore diameter is denoted by D, a value ($dV/d(\log D)$) is obtained by dividing the differential pore volume dV by a differential logarithm $d(\log D)$ of the pore diameter. Next, a differential pore distribution curve is obtained by plotting the $dV/d(\log D)$ for an average pore diameter in each section. A differential pore volume dV denotes an increment of pore volume between measurement points.

A method for measuring a radius and a pore volume of micropores by a nitrogen adsorption method (MP method) is not particularly limited. For example, methods disclosed in well-down literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article written by R. Sh. Mikhail, S. Brunauer, and E. E. Bodor in J. Colloid Interface Sci., 26, 45 (1968) may be employed. In this description, the radius and pore volume of micropores by a nitrogen adsorption method (MP method) are a value measured by the method disclosed in the article written by R. Sh. Mikhail, S. Brunauer, and E. E. Bodor in J. Colloid Interface Sci., 26, 45 (1968).

A method for measuring a radius and a pore volume of mesopores by a nitrogen adsorption method (DH method) is not particularly limited. For example, methods disclosed in well-known literatures such as "Science of Adsorption" (second edition written by Kondo Seiichi, Ishikawa Tatsuo, and Abe Ikuo, Maruzen Co., Ltd.), "Fuel Cell Analysis Method" (compiled by Takasu Yoshio, Yoshitake Yu, and Ishihara Tatsumi of KAGAKU DOJIN), and an article by D. Dollion and G. R. Heal in J. Appl. Chem. 14, 109 (1964) may be employed. In this description, the radius and pore volume of mesopores by a nitrogen adsorption method (DH method) are a value measured by the method disclosed in the article written by D. Dollion and G. R. Heal in J. Appl. Chem. 14, 109 (1964).

A method of manufacturing a carbon powder having a specific pore distribution as described above is not particularly limited. Specifically, a heat treatment method of a carbon material is preferably used. Alternatively, a method which comprises producing a carbon material having micropores and mesopores and having a pore volume of micropores of 0.3 cc/g-support or more by a method disclosed in, for example, JP 2010-208887 A (corresponding to US 2011/0318254 A1), WO 2009/75264 A (corresponding to US 2011/0058308 A1), or the like, and subjecting the carbon material to heat treatment method; and a method which comprises producing a carbon material having micropores and mesopores and having mode radius of pore distribution of micropores of 0.3 nm or more and less than 1 nm by a method disclosed in, for example, JP 2010-208887 A, WO 2009/75264 A, or the like, and subjecting the carbon material to heat treatment method can be preferably used.

The heat treatment conditions of carbon material is not particularly limited as long as the above configurations (a) and (b) or the above configurations (a), (b), and (c) can be achieved. Specifically, a temperature in the heat treatment is preferably lower than 1800° C., more preferably over 1300° C. up to 1780° C., further more preferably in the range of 1400 to 1750° C., and particularly preferably in the range of 1500 to 1700° C. A temperature rising rate in the heat treatment is preferably in the range of 100 to 1000° C./h, and particularly preferably in the range of 300 to 800° C./h. A time in the heat treatment (holding time at a predetermined heat treatment temperature) is preferably in the range of 1 to 10 minutes, and particularly preferably in the range of 2 to 8 minutes. The heat treatment can be carried out under an air atmosphere or an inert gas atmosphere such as argon gas or nitrogen gas. Under such conditions, the carbon powder which satisfies the above configurations (a) and (b) or the above configurations (a), (b), and (c) can be conveniently obtained. When the heat treatment conditions are below the lower limits (the heat treatment conditions are too gentle), there would be a possibility that the edge quantity of carbon (graphene) cannot be sufficiently reduced. Conversely, when the heat treatment conditions are over the upper limits (the heat treatment conditions are too strict), the graphitization would too proceed, to unduly decrease a BET specific surface area of carbon (graphene).

A material of the carbon material is not particularly limited as long a main component is carbon, but is preferable to easily form a carbon powder satisfying the BET specific surface area and the R' value described above or the BET specific surface area, the R' value, and the R value described above. In addition, a material which has enough specific surface area and enough electron conductivity to form pores (primary pores) having a pore volume or a mode diameter and to support a catalyst component inside a mesopore in a dispersed state is more preferably used. In the latter case, the carbon material particularly preferably satisfies the above configurations (i) and (ii) and/or (iv). Specifically, carbon particles made of carbon black (Ketjen Black, oil furnace black, channel black, lamp black, thermal black, acetylene black, or the like), activated charcoal, or the like may be exemplified. The expression "main component is carbon" denotes that the carbon material contains a carbon atom(s) as a main component, and includes both of the configurations that the carbon material consists only of carbon atoms and that the carbon material substantially consists of carbon atoms. An element(s) other than carbon atom may be contained. The expression "substantially consists of carbon atoms" denotes that impurities of about 2 to 3 wt % or less can be contaminated.

A BET specific surface area of the carbon material is not particularly limited, but is substantially similar to the BET specific surface area of the carbon powder. A BET specific surface area of the carbon material is 900 m$^2$/g or more, preferably in the range of 1000 to 3000 m$^2$/g, more preferably in the range of 1100 to 1800 m$^2$/g, and particularly preferably in the range of 1200 to 1800 m$^2$/g. With such a specific surface area as described above, sufficient gas transportability (lower gas transport resistance) and performance (supporting a sufficient amount of catalyst metals) can be achieved.

An average particle size (average secondary particle diameter) of the carbon material is not particularly limited, but is preferably in the range of 20 to 100 nm. From a viewpoint of easy supporting, utilization rate of catalyst, and the like, an average particle size (average primary particle diameter) of the carbon material may be in the range of 1 to 10 nm, and preferably in the range of 2 to 5 nm. When the average particle size is within such a range, even when the above-described pore structure is formed in the support, mechanical strength can be maintained, and a catalyst layer can be controlled within an appropriate range. As a value of the "average particle size of the carbon material", unless otherwise specified, a value calculated as an average value of particle diameters of particles observed within several or several tens of fields by using observation means such as a scanning electron microscope (SEM) or a transmission electron microscope (TEM) is employed. In addition, the "particle size (diameter)" denotes a maximum distance among distances between arbitrary two points on an outline of a particle.

A catalyst metal which can be used in the present invention performs catalysis of electrochemical reaction. As a catalyst metal used for an anode catalyst layer, a well-known catalyst can be used in a similar manner without particular limitation if the catalyst has catalytic effects on oxidation reaction of hydrogen. In addition, as a catalyst metal used for a cathode catalyst layer, a well-known catalyst can be used in a similar manner without particular limitation if the catalyst has catalytic effects on reduction reaction of oxygen. Specifically, the catalyst metal can be selected among metals such as platinum, ruthenium, iridium, rhodium, palladium, osmium, tungsten, lead, iron, copper, silver, chromium, cobalt, nickel, manganese, vanadium, molybdenum, gallium, and aluminum, and alloys thereof.

Among them, in view of improved catalytic activity, poison resistance to carbon monoxide or the like, heat resistance, or the like, a catalyst metal containing at least platinum is preferably used. Namely, the catalyst metal preferably is platinum or contains platinum and a metal component(s) other than the platinum, more preferably is platinum or a platinum-containing alloy. Such a catalyst metal can exhibit high activity. Particularly, when the catalyst metal is platinum, since platinum having a small particle size can be dispersed on a surface of carbon powder (support), platinum surface area per unit weight can be maintained even with a reduced amount of platinum. In addition, when the catalyst metal includes platinum and a metal component(s) other than platinum, since an amount of expensive platinum to be used can be reduced, which is preferred in view of costs. Although a composition of an alloy depends on a kind of the metal constituting the alloy, a content of platinum may be in the range of 30 to 90 atom %, and a content of a metal constituting the alloy together with platinum may be in the range of 10 to 70 atom %. In general, an alloy is obtained by mixing a metal element with at least one metal element or non-metal element, and is a general term for substances having metallic properties. The structure of the alloy includes an eutectic alloy which is a mixture where component elements form separate crystals, an alloy where component elements are completely fused to form a solid solution, an alloy where component elements form a intermetallic compound or a compound between a metal and a non-metal, and the like, and any one thereof may be employed in the present application. A catalyst metal used in an anode catalyst layer and a catalyst metal used in a cathode catalyst layer can be appropriately selected from the aforementioned alloys. In this description, unless otherwise noted, the description of the catalyst metal for the anode catalyst layer and the catalyst metal for the cathode catalyst layer have the same definition. However, the catalyst metal for the anode catalyst layer and the catalyst metal for the cathode catalyst layer are not necessarily the same, and the catalyst metals can be appropriately selected so that the desired functions described above can be attained.

A shape and size of the catalyst metal (catalyst component) are not particularly limited, but the shapes and sizes of well-known catalyst components may be employed. As the shape, for example, a granular shape, a squamous shape, a laminar shape, or the like may be used, but the granular shape is preferred. In this case, an average particle size (diameter) of the catalyst metal (catalyst metal particle) is not particularly limited, but is 3 nm or more, preferably more than 3 nm and 30 nm or less, and particularly preferably more than 3 nm and 10 nm or less. When the average particle size of the catalyst metal is 3 nm or more, the catalyst metal is relatively strongly supported on the carbon powder (for example, in a mesopore of the carbon powder) and can be more effectively suppressed and prevented from contacting with an electrolyte in a catalyst layer. Further, when the carbon powder has micropores, the micropores are not blocked by the catalyst metals but remain, and thus, a gas transport path can be more efficiently secured, so that gas transport resistance can be further reduced. In addition, elution due to a change in voltage can be prevented, and temporal degradation in performance can be also suppressed. Therefore, catalytic activity can be further improved, namely, catalyst reaction can be more efficiently facilitated. On the other hand, if the average particle diameter of the catalyst metal particles is 30 nm or less, the catalyst metals can be supported on the carbon powder (for example, inside the mesopores of the carbon powder) in a simple manner, so that a coating ratio of catalyst metals with an electrolyte can be reduced. In the present invention, the "average particle size of catalyst metal particles" can be measured as an average value of a crystallite diameter obtained from a half-value width of a diffraction peak of a catalyst metal component in X-ray diffraction or as an average value of a particle size of catalyst metal particle examined from a transmission electron microscope (TEM).

In this embodiment, a catalyst metal content per unit catalyst-coated area (mg/cm$^2$) is not particularly limited so long as a sufficient dispersibility of catalyst on a support and power generation performance can be obtained. For example, the catalyst metal content is in the range of 0.01 to 1 mg/cm$^2$. However, in the case where the catalyst contains platinum or a platinum-containing alloy, a platinum content per unit catalyst-coated area is preferably 0.5 mg/cm$^2$ or less. The usage of expensive noble metal catalyst represented by platinum (Pt) or a platinum alloy induces an increased cost of a fuel cell. Therefore, it is preferable to reduce the cost by decreasing an amount of the expensive platinum (platinum content) to the above-described range. A lower limit is not particularly limited so long as power generation performance can be attained, and for example, the lower limit value is 0.01 mg/cm$^2$ or more. The platinum content is more preferably in the range of 0.02 to 0.4 mg/cm$^2$. In this embodiment, since the activity per catalyst weight can be improved by controlling the pore structure of the support, the amount of an expensive catalyst can be reduced.

In this description, an inductively coupled plasma emission spectroscopy (ICP) is used for measurement (determination) of a "content of catalyst (platinum) per unit catalyst-coated area (mg/cm2)". A method of obtaining a desired "content of catalyst (platinum) per unit catalyst-coated area (mg/cm2)" can be easily performed by the person skilled in the art, and the content can be adjusted by controlling a slurry composition (catalyst concentration) and a coated amount.

A supported amount (in some cases, referred to as a support ratio) of a catalyst on a support is preferably in the range of 10 to 80 wt %, more preferably in the range of 20 to 70 wt %, with respect to a total amount of the catalyst support (that is, the support and the catalyst). The supported amount within the aforementioned range is preferable in terms of sufficient dispersibility of a catalyst component on a support, improved power generation performance, economical merit, and catalytic activity per unit weight.

As long as the carbon powder satisfies the configurations (a) and (b) described above, and particularly preferably satisfies the configurations (a), (b), and (c), a structure of the catalyst is not particularly limited. However, as described above, particularly preferably the carbon powder further satisfies the following configurations (i) and (ii) and/or (iv). In this case, the catalyst (also referred to as an "electrode catalyst" in this description) includes the carbon powder (catalyst support) of the present invention and a catalyst metal to be supported on the carbon powder, and preferably satisfies the following configurations (i) to (iii):

(i) the catalyst includes pores (primary pores) having a radius of less than 1 nm and pores (primary pores) having a radius of 1 nm or more;

(ii) a pore volume of the pores having the radius of less than 1 nm is 0.3 cc/g-support or more; and (iii) at least a part of the catalyst metals are supported inside the pores having a radius of 1 nm or more.

Similarly, the catalyst (also referred to as an "electrode catalyst" in this description) includes the carbon powder (catalyst support) of the present invention and a catalyst metal to be supported on the carbon powder, and preferably satisfies the following configurations (i), (iv), and (iii):

(i) the catalyst includes pores having a radius of less than 1 nm and pores having a radius of 1 nm or more;

(iv) a mode radius of pore distribution of pores having a radius of less than 1 nm is 0.3 nm or more and less than 1 nm; and (iii) at least a part of the catalyst metals are supported inside a pore having a radius of 1 nm or more.

The present inventors have found that, even in the case where a catalyst is not in contact with an electrolyte, the catalyst forms a three-phase boundary with and water, so that the catalyst can be effectively used. Thus, the catalytic activity can be improved by taking the configuration (iii) where a catalyst metal(s) is supported inside a mesopore(s) which an electrolyte cannot enter.

On the other hand, in the case where a catalyst metal(s) is supported inside a mesopore(s) which an electrolyte cannot enter, a transporting distance of a gas such as oxygen is increased, and thus, gas transportability is deteriorated. Therefore, a sufficient catalytic activity cannot be exhibited, and catalyst performance is deteriorated under high load conditions. On the contrary, by securing a sufficient pore volume of micropores in the configuration (ii) or by setting a mode radius of micropore to be large in the configuration (iv), sufficient path for transporting a gas can be secured. Thus a gas such as oxygen can be efficiently transported to a catalyst in a mesopore, and namely, gas transport resistance can be reduced. Due to this configuration, a gas (for example, oxygen) can pass through the micropores (gas transportability is improved), and the gas may be allowed to be efficiently in contact with the catalyst.

Therefore, when the catalyst satisfies the above configurations (i) to (iii) or the above configurations (i), (iv) and (iii), since the micropores exist with a large volume, a reaction gas can be transported through the micropores (paths) to a surface of catalyst metal existing in the mesopore, gas transport resistance can decrease. Therefore, the catalyst can exhibit a high catalytic activity, and namely, the catalyst reaction can be facilitated. For this reason, the membrane electrode assembly and fuel cell comprising the catalyst layer using the catalyst according to the present invention have an excellent power generation performance.

Hereinafter, an embodiment satisfying the above configurations (i) to (iii) or the above configurations (i), (iv), and (iii) will be described in detail. However, the following embodiment is a preferred form of the present invention, and the present invention is not limited to the following embodiment.

Figure 2:
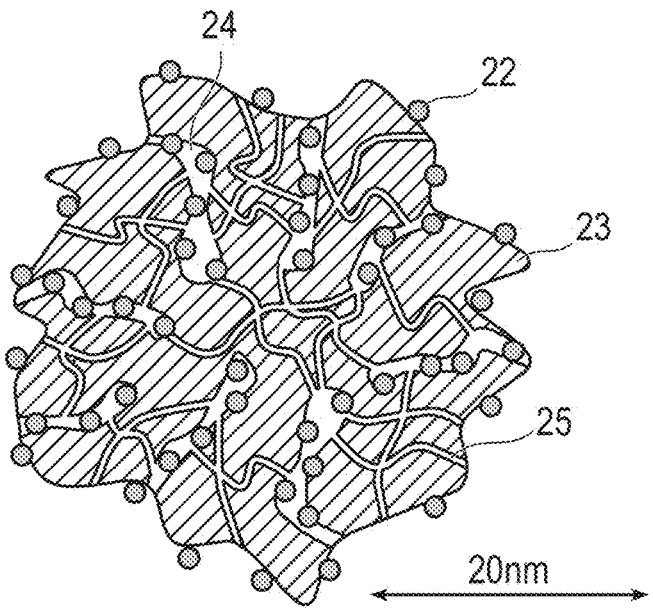
FIG. 2 is a schematic cross-sectional diagram illustrating a shape and a structure of a catalyst according to an embodiment of the present invention.

FIG. 2 is an explanatory cross-sectional diagram schematically illustrating a shape and a structure of the catalyst satisfying the above configurations (i) to (iii) or the above configurations (i), (iv) and (iii). As illustrated in FIG. 2, a catalyst 20 is composed of catalyst metal 22 and catalyst support (carbon powder of the present invention) 23. The catalyst 20 includes pores (micropores) 25 having a radius of less than 1 nm and pores (mesopores) 24 having a radius of 1 nm or more. The catalyst metal 22 is supported inside the mesopore 24. In addition, at least a portion of the catalyst merals 22 may be supported inside the mesopores 24, and at least a portion thereof may be supported on the surface of the catalyst support 23. However, in view of preventing the catalyst metal from being contacted with an electrolyte in a catalyst layer, it is preferable that substantially all the catalyst merals 22 be supported inside the mesopores 24. As used herein, the expression "substantially all the catalyst metals" is not particularly limited if an amount which can improve a sufficient catalytic activity can be attained. The amount of "substantially all the catalyst metals" is preferably 50 wt % or more (upper limit: 100 wt %), more preferably 80 wt % or more (upper limit: 100 wt %), with respect to all the catalyst metals.

In this description, the state "the catalyst metals are supported inside the mesopores" can be confirmed by a decrease in volume of mesopores before and after the supporting of catalyst metals on a catalyst support. Specifically, a catalyst support (hereinafter, also simply referred to as a "support") contains micropores and mesopores, and the pores have the respective certain volumes. If catalyst metals are supported in the pore(s), the volumes of the pores are decreased. Therefore, the case where a difference between a volume of mesopores of a catalyst (support) before the supporting of catalyst metals and a volume of mesopores of a catalyst (support) after the supporting of catalyst metals [=(volume before supporting)−(volume after supporting)] exceeds 0 indicates that "the catalyst metals are supported inside the mesopore(s)". Similarly, the case where a difference between a volume of micropores of a catalyst (support) before the supporting of catalyst metals and a volume of micropores of a catalyst (support) after the supporting of catalyst metals [=(volume before supporting)−(volume after supporting)] exceeds 0 indicates that "the catalyst metals are supported inside the micropore(s)". Preferably, a larger number of catalyst metals are supported in mesopores than in micropores (namely, (decreased volume of mesopores before and after the supporting)>(decreased volume of micropores before and after the supporting)). By this, gas transport resistance can be reduced and a path for gas transportation can be sufficiently secured. In terms of reduced gas transport resistance and securing of a path for gas transportation, a decreased pore volume of mesopores before and after the supporting of the catalyst metals is preferably 0.02 cc/g or more, more preferably in the range of 0.02 to 0.21 cc/g.

A pore volume of pores (micropores) having a radius of less than 1 nm of a catalyst (after catalyst metal(s) is supported) is 0.3 cc/g support or more, and/or a mode radius of a pore distribution of micropores of a catalyst (after catalyst metal(s) is supported) (maximum frequency diameter) is 0.3 nm or more and less than 1 nm. Preferably, the pore volume of micropores is 0.3 cc/g support or more, and the mode radius of the pore distribution of micropores is 0.3 nm or more and less than 1 nm. If the pore volume of micropores and/or the mode diameter are within such ranges, enough micropores for gas transportation can be secured, so that gas transport resistance becomes small. Therefore, since a sufficient amount of a gas can be transported to a surface(s) of catalyst metal(s) existing in the mesopores via micropores (path), the catalyst according to the present invention can exhibit a high catalyst activity, and namely, the catalyst reaction can be facilitated. In addition, an electrolyte (ionomer) or liquid (for example, water) cannot enter the micropores, and only a gas can selectively pass through the micropores (gas transport resistance can be reduced). In terms of effects of improving gas transportability, the pore volume of micropores is more preferably in the range of 0.3 to 2 cc/g support, particularly preferably in the range of 0.4 to 1.5 cc/g support. The mode radius of the pore distribution of micropores is more preferably in the range of 0.4 to 1 nm, particularly in the range of 0.4 to 0.8 nm.

A pore volume of the pores (mesopores) having a radius of 1 nm or more of a catalyst (after catalyst metal(s) is supported) is not particularly limited, but it is preferably 0.4 cc/g support or more, more preferably in the range of 0.4 to 3 cc/g support, particularly preferably in the range of 0.4 to 1.5 cc/g support. If the pore volume is within such a range, a larger number of catalyst metals can be placed (supported) in the mesopores, and thus, an electrolyte and a catalyst metal(s) in the catalyst layer are physically separated from each other (contact of a catalyst metal(s) and an electrolyte can be more effectively suppressed and prevented). Therefore, activity of the catalyst metals can be more effectively used. In addition, due to existence of a large number of mesopores, the function and effects by the present invention can be further remarkably exhibited, so that a catalyst reaction can be more effectively facilitated. Also, the micropores function as a gas transport path, and thus, three phase boundary with water can be more remarkably formed, so that the catalytic activity can be more improved.

A mode radius (maximum frequent diameter) of a pore distribution of pores (mesopores) having a radius of 1 nm or more of a catalyst (after catalyst metal(s) is supported) is not particularly limited, but it is preferably in the range of 1 to 5 nm, more preferably in the range of 1 to 4 nm, particularly preferably in the range of 1 to 3 nm. If the mode diameter of the pore distribution of mesopores is within such a range, a sufficient number of catalyst metals can be placed (supported) in the mesopores, and thus, an electrolyte and a catalyst metal(s) in the catalyst layer are physically separated from each other (contact of a catalyst metal(s) and an electrolyte can be more effectively suppressed and prevented). Therefore, activity of the catalyst metals can be more effectively used. In addition, due to existence of a large volume of mesopores, the function and effects by the present invention can be further remarkably exhibited, so that a catalyst reaction can be more effectively facilitated. Also, the micropores function as a gas transport path, and thus, three phase boundary with water can be more remarkably formed, so that the catalytic activity can be more improved.

A BET specific surface area of a catalyst (after catalyst metal(s) is supported) [BET specific surface area of catalyst per 1 g of support ($m^2$/g support)] is not particularly limited, but is 900 $m^2$/g support or more, more preferably in the range of 1000 to 3000 $m^2$/g support, particularly preferably in the range of 1100 to 1800 $m^2$/g support. If the specific surface area is within the above-described range, since sufficient mesopores and micropores can be secured, enough micropores to transport a gas (lower gas transport resistance) can be secured, and a larger number of the catalyst metals can be placed (supported) in the mesopores. In addition, an electrolyte and catalyst metals in the catalyst layer can be physically separated from each other (contact between catalyst metals and an electrolyte can be more effectively suppressed and prevented). Therefore, activity of the catalyst metals can be more effectively used. Also, due to existence of a large number of the micropores and mesopores, the function and effects by the present invention can be further remarkably exhibited, so that a catalyst reaction can be more effectively facilitated. In addition, the micropores function as a gas transport path, and thus, a three-phase boundary with water is more remarkably formed, so that the catalytic activity can be more improved.

A method of manufacturing a catalyst (method for supporting a catalyst metal on a carbon powder) according to the present invention is not particularly limited. Preferably, a method which comprises precipitating a catalyst metal on a surface of catalyst support, and thereafter performing heat treatment to increase a particle diameter of the catalyst metal is preferred. The method increases a granular size of the catalyst metals by the heat treatment after the precipitating. Therefore, the catalyst metals having a large particle diameter can be supported in pores (particularly, mesopores) of catalyst support. Namely, the present invention also provides a method of manufacturing the catalyst according to the present invention, which includes (i) a step (precipitation step) of precipitating a catalyst metal on a surface of a catalyst support and (ii) a step (heat treatment step) of, after the precipitation step, performing heat treatment to increase a particle diameter of the catalyst metal. Hereinafter, the method will be described, but the present invention is not limited to the following form.

Hereinafter, a preferred embodiment of the method of manufacturing a catalyst will be described, but the present invention is not limited to the following embodiment.

(i) Precipitation Step

In this step, a catalyst metal(s) is allowed to be precipitated on a surface(s) of a catalyst support(s). The step has been known in the art and, for example, a method of immersing the catalyst supports in a precursor solution of the catalyst metal and, after that, performing reduction is preferably used.

Herein, a precursor of catalyst metal is not particularly limited, but it is appropriately selected according to a kind of the catalyst metal which is to be used. Specifically, chlorides, nitrates, sulfates, chlorides, acetates, amine compounds or the like of the catalyst metals such as platinum as described above may be exemplified. More specifically, chlorides such as platinum chloride (hexachloroplatinic acid hexahydrate), palladium chloride, rhodium chloride, ruthenium chloride, and cobalt chloride, nitrates such as palladium nitrate, rhodium nitrate, and iridium nitrate, sulfates such as palladium sulfate and rhodium sulfate, acetates such as rhodium acetate, ammine compounds such as dinitrodiammine platinum nitric acid and dinitrodiammine palladium, or the like may be preferably exemplified. In addition, a solvent used for manufacturing the precursor solution of catalyst metal is not particularly limited so long as the solvent can dissolve the precursor of catalyst metal. The solvent is appropriately selected according to a kind of the precursor of catalyst metal which is to be used. Specifically, water, acids, alkalis, organic solvents, or the like may be exemplified. A concentration of the precursor of catalyst metal in the precursor solution of the catalyst metal is not particularly limited, but is preferably in the range of 0.1 to 50 wt %, more preferably in the range of 0.5 to 20 wt %, in terms of metal.

As a reducing agent, hydrogen, hydrazine, sodium hydroborate, sodium thiosulfate, citric acid, sodium citrate, L-ascorbic acid, sodium borohydride, formaldehyde, methanol, ethanol, ethylene, carbon monoxide, or the like may be exemplified. A material which is gaseous at room temperature such as hydrogen can be supplied by bubbling. An amount of the reducing agent is not particularly limited so long as the precursor of catalyst metal can be reduced to the catalyst metal, and a well-known amount can be applied in the same manner.

Precipitation conditions are not particularly limited so long as the catalyst metal can be precipitated on the catalyst support. For example, a precipitation temperature is preferably a temperature around the boiling point of the solvent, more preferably in the range of room temperature to 100° C. A precipitation time is preferably in the range of 1 to 10 hours, more preferably in the range of 2 to 8 hours. The precipitation step may be performed while stirring and mixing if necessary.

By the step, the precursor of the catalyst metal is reduced to the catalyst metal, so that the catalyst metal is precipitated (supported) on the catalyst support.

(ii) Heat Treatment Step

In this step, after the (i) precipitation step, heat treatment is performed to increase a particle diameter of the catalyst metals.

Heat treatment conditions are not particularly limited so long as a particle diameter of the catalyst metals increase. For example, a heat treatment temperature is preferably in the range of 300 to 1200° C., more preferably in the range of 500 to 1150° C., particularly preferably in the range of 700 to 1000° C. A heat treatment time is preferably in the range of 0.02 to 3 hours, more preferably in the range of 0.1 to 2 hours, particularly preferably in the range of 0.2 to 1.5 hours. The heat treatment step may be performed in a hydrogen ambience.

By this step, the catalyst metal increases its particle diameter in the catalyst support (particularly, in the mesopores of the catalyst support). Therefore, the catalyst metal particles are hardly detached outside (from the catalyst supports). In addition, due to the microspores existing in the vicinity of the surface of the catalyst support from the catalyst metal, the catalyst metals having a larger size can be more effectively suppressed and prevented from being detached from the catalyst support even under a mechanical stress. Therefore, the catalyst can be more effectively used.

[Catalyst Layer]

As described above, the catalyst of the present invention can reduce gas transport resistance, so that the catalyst can exhibit a high catalytic activity and in other words, catalyst reaction can be promoted. Therefore, the catalyst of the present invention can be advantageously used for an electrode catalyst layer for fuel cell. Namely, the present invention provides an electrode catalyst layer for fuel cell including the electrode catalyst according to the present invention and an electrolyte. The electrode catalyst layer for fuel cell can manifest high performance and durability.

The electrode catalyst layer for fuel cell of the present invention can be applied in the same manner as in a conventional manner or by appropriately modifying a conventional manner except for using the carbon powder of the present invention as a support. Accordingly, a preferred embodiment of the catalyst layer will be described below, but the present invention is not limited to the following embodiment.

Figure 3:
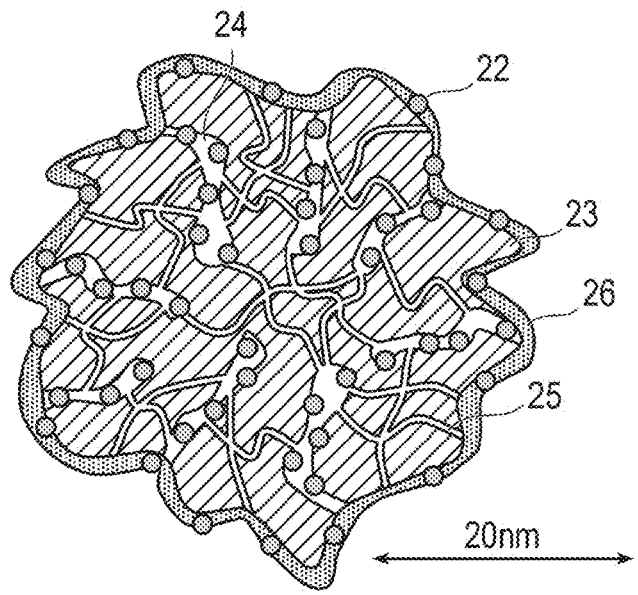
FIG. 3 is a schematic diagram illustrating as an example a relation between a catalyst and an electrolyte in a catalyst layer when a carbon powder is as illustrated in FIG. 2.

FIG. 3 is a schematic diagram illustrating an example of the relation between a catalyst and an electrolyte in a catalyst layer in the case where the carbon powder is as illustrated in FIG. 2.

As illustrated in FIG. 3, in the catalyst layer, although the catalyst is coated with the electrolyte 26, the electrolyte 26 does not enter the mesopores 24 (and the micropores 25) of the catalyst (support 23). Therefore, although the catalyst metal 22 on the surface of the support 23 is in contact with the electrolyte 26, the catalyst metal 22 supported in the mesopore 24 is not in contact with the electrolyte 26. The catalyst metal in the mesopore forms three-phase boundary with an oxygen gas and water in a state that the catalyst metal is not in contact with the electrolyte, so that a reaction active area of the catalyst metals can be secured.

Although the catalyst according to the present invention may exist either in a cathode catalyst layer or an anode catalyst layer, the catalyst is preferably used in a cathode catalyst layer. As described above, although the catalyst according to the present invention is not in contact with the electrolyte, the catalyst can be effectively used by forming three-phase boundary of the catalyst and water. This is because water is formed in the cathode catalyst layer.

An electrolyte is not particularly limited, but it is preferably an ion-conductive polymer electrolyte. Since the polymer electrolyte serves to transfer protons generated in the vicinity of the catalyst active material on a fuel electrode side, the polymer electrolyte is also referred to as a proton conductive polymer.

The polymer electrolyte is not particularly limited, but well-known knowledge in the art can be appropriately referred to. The polymer electrolytes are mainly classified into fluorine-based polymer electrolytes and hydrocarbon-based polymer electrolytes depending on a type of an ion-exchange resin as a constituent material.

As an ion-exchange resin constituting the fluorine-based polymer electrolyte, for example, perfluorocarbon sulfonic acid based polymers such as Nafion (registered trademark, produced by DuPont), Aciplex (registered trademark, produced by Asahi Kasei Co., Ltd.), and Flemion (registered trademark, produced by Asahi Glass Co., Ltd.), perfluorocarbon phosphoric acid based polymers, trifluorostyrene sulfonic acid based polymers, ethylene tetrafluoroethylene-g-styrene sulfonic acid based polymers, ethylene-tetrafluoroethylene copolymers, polyvinylidene fluoride-perfluorocarbon sulfonic acid based polymers, and the like may be exemplified. In terms excellent heat resistance, chemical stability, durability, and mechanical strength, the fluorine-based polymer electrolyte is preferably used, and a fluorine-based polymer electrolyte formed of a perfluorocarbon sulfonic acid based polymer is particularly preferably used.

As a hydrocarbon-based electrolyte, sulfonated polyether sulfones (S-PES), sulfonated polyaryl ether ketones, sulfonated polybenzimidazole alkyls, phosphonated polybenzimidazole alkyls, sulfonated polystyrenes, sulfonated polyether ether ketones (S-PEEK), sulfonated polyphenylenes (S-PPP), and the like may be exemplified. In terms of manufacturing advantages such as inexpensive raw materials, simple manufacturing processes, and high selectivity of materials, a hydrocarbon-based polymer electrolyte is preferably used. These ion-exchange resins may be singly used, or two or more resins may be used together. In addition, the material is not limited to the above-described material, but another material may be used.

With respect to the polymer electrolyte which serves to transfer protons, proton conductivity is important. In the case where EW of a polymer electrolyte is too large, ion conductivity with in the entire catalyst layer would be decreased. Therefore, the catalyst layer according to the embodiment preferably includes a polymer electrolyte having a small EW. Specifically, catalyst layer according to the embodiment preferably includes a polymer electrolyte having an EW of 1500 g/eq. or less, more preferably includes a polymer electrolyte having an EW of 1200 g/eq. or less, and particularly preferably includes a polymer electrolyte having an EW of 1000 g/eq. or less.

On the other hand, in the case where the EW is too small, since hydrophilicity is too high, water is hard to smoothly move. Due to such a point of view, the EW of polymer electrolyte is preferably 600 or more. The EW (Equivalent Weight) represents an equivalent weight of an exchange group having proton conductivity. The equivalent weight is a dry weight of an ion exchange membrane per 1 eq. of ion exchange group, and is represented in units of "g/eq.".

It is preferable that the catalyst layer includes two types or more of polymer electrolytes having different EWs in a power generation surface, and in this case, among the polymer electrolytes, the polymer electrolyte having the lowest EW is used in an area where relative humidity of a gas in a passage is 90% or less. By employing such material arrangement, resistance is decreased irrespective of a current density area, so that cell performance can be improved. The EW of polymer electrolyte used in the area where relative humidity of the gas in a passage is 90% or less, that is, EW of polymer electrolyte having the lowest EW is preferably 900 g/eq. or less. By this, the above-described effects can be further more certainly and more remarkably attained.

The polymer electrolyte having the lowest EW is preferably used in an area of which temperature is higher than an average temperature of inlet and outlet for cooling water. By this, resistance is decreased irrespective of a current density area, so that cell performance can be further improved.

In terms decreased resistance value of a fuel cell system, the polymer electrolyte having the lowest EW is preferably provided in an area within the range of ⅗ or less of the passage length from a gas supply inlet of at least one of a fuel gas and an oxidant gas.

The catalyst layer according to the embodiment may include, between the catalyst and the polymer electrolyte, a liquid proton conducting material capable of connecting the catalyst and the polymer electrolyte in a proton conductible state. By introducing the liquid proton conducting material, a proton transport path through the liquid proton conducting material is provided between the catalyst and the polymer electrolyte, so that protons necessary for the power generation can be efficiently transported on the surface of the catalyst. By this, availability of the catalyst is improved, and thus an amount of used catalyst can be reduced while maintaining power generation performance. The liquid proton conducting material may be interposed between the catalyst and the polymer electrolyte. The liquid proton conducting material may be disposed in pores (secondary pores) between porous supports in a catalyst layer or may be disposed in pores (micropores or mesopores: primary pores) in porous supports.

The liquid proton conducting material is not particularly limited if the material has ion conductivity and has a function of forming a proton transport path between the catalyst and the polymer electrolyte. Specifically, water, aprotic ionic liquid, an aqueous solution of perchloric acid, an aqueous solution of nitric acid, an aqueous solution of formic acid, an aqueous solution of acetic acid, and the like may be exemplified.

In the case of using water as the liquid proton conducting material, the water can be introduced as the liquid proton conducting material into the catalyst layer by wetting the catalyst layer with a small amount of liquid water or a humidified gas before the start of power generation. In addition, water generated through electrochemical reaction during the operation of a fuel cell may be used as the liquid proton conducting material. Therefore, in a state where a fuel cell starts to be operated, the liquid proton conducting material is not necessarily retained. For example, a surface distance between the catalyst and the electrolyte is preferably set to be a diameter of an oxygen ion constituting a water molecule, that is, 0.28 nm or more. By maintaining such a distance, water (liquid proton conducting material) can be interposed between the catalyst and the polymer electrolyte (in the liquid conducting material retaining portion) while maintaining the non-contact state between the catalyst and the polymer electrolyte, so that a proton transport path can be secured by water therebetween.

In the case of using a material such as an ionic liquid other than water as the liquid proton conducting material, the ionic liquid, the polymer electrolyte, and the catalyst are preferably allowed to be dispersed in a solution in the preparation of a catalyst ink. However, the ionic liquid may be added at the time of coating a catalyst layer substrate with a catalyst.

In the catalyst according to the present invention, a total area of the catalyst which is in contact with the polymer electrolyte is set to be smaller than a total area of the catalyst exposed to the liquid conducting material retaining portion.

Comparison of these areas can be performed, for example, by obtaining a magnitude relationship between capacitance of an electrical double layer formed in a catalyst-polymer electrolyte interface and capacitance of an electrical double layer formed in a catalyst-liquid proton conducting material interface in a state where the liquid conducting material retaining portion is filled with the liquid proton conducting material. Namely, since capacitance of an electrical double layer is proportional to an area of an electrochemically effective interface, if the capacitance of the electrical double layer formed in the catalyst-electrolyte interface is smaller than the capacitance of the electrical double layer formed in the catalyst-liquid proton conducting material interface, a contact area of the catalyst with the electrolyte is smaller than an area thereof exposed to the liquid conducting material retaining portion.

Herein, a measuring method for capacitance of an electrical double layer formed in a catalyst-electrolyte interface and capacitance of an electrical double layer formed in a catalyst-liquid proton conducting material interface, that is, a magnitude relationship between a contact area of the catalyst with the electrolyte and a contact area of the catalyst and the liquid proton conducting material (determination method for a magnitude relationship between a contact area of the catalyst and the electrolyte and an area of the catalyst exposed to the liquid conducting material retaining portion) will be described.

Namely, in the catalyst layer according to the embodiment, the following four types of interfaces can contribute as capacitance of electrical double layer (Cdl):

(1) catalyst-polymer electrolyte (C-S)
(2) catalyst-liquid proton conducting material (C-L)
(3) porous support-polymer electrolyte (Cr-S)
(4) porous support-liquid proton conducting material (Cr-L)

As described above, since capacitance of an electrical double layer is proportional to an area of an electrochemically effective interface, CdlC-S (capacitance of an electrical double layer in a catalyst-polymer electrolyte interface) and CdlC-L (capacitance of an electrical double layer in a catalyst-liquid proton conducting material interface) may be obtained. Therefore, the contribution of the four types of interfaces to capacitance of an electrical double layer (Cdl) can be identified as follows.

First, for example, under a high humidity condition such as 100% RH and under a lower humidity condition such as 10% RH or less, each capacitance of electrical double layers is measured. As a measurement method for the capacitance of electrical double layer, cyclic voltammetry, electrochemical impedance spectroscopy, or the like may be exemplified. From the comparison, the contribution of the liquid proton conducting material (in this case, "water"), that is, the above-described contributions (2) and (4) can be identified.

In addition, the contributions to capacitance of an electrical double layer can be identified by deactivating a catalyst, for example, in the case of using Pt as the catalyst, by deactivating the catalyst by supply CO gas to an electrode to be measured to allow CO to be adsorbed on the surface of Pt. In this state, as described above, under the high humidity condition and under the low humidity condition, each capacitance of electrical double layers is measured by the same method, and from the comparison, the contributions of the catalyst, that is, the above-described contributions (1) and (2) can be identified.

By using the above-described method, all the contributions (1) to (4) described above can be identified, the capacitance of the electrical double layer in the interface between the catalyst and the polymer electrolyte and the capacitance of the electrical double layer in the interface between the catalyst and the liquid proton conducting material can be obtained.

Namely, a measurement value (A) in a highly-humidified state can be regarded as capacitance of electrical double layer formed in all the interfaces (1) to (4), and a measurement value (B) in a lowly-humidified state can be regarded as capacitance of the electrical double layer formed in the interfaces (1) and (3). In addition, a measurement value (C) in a catalyst-deactivated and highly-humidified state can be regarded as capacitance of the electrical double layer formed in the interfaces (3) and (4), and a measurement value (D) in a catalyst-deactivated and lowly-humidified state can be regarded as capacitance of the electrical double layer formed in the interface (3).

Therefore, the difference between A and C can be regarded as the capacitance of the electrical double layer formed in the interfaces (1) and (2), and the difference between B and D can be regarded as the capacitance of the electrical double layer formed in the interface (1). Next, by calculating the difference between these values, i.e., (A–C)–(B–D), the capacitance of the electrical double layer formed in the interface (2) can be obtained. In addition, a contact area of the catalyst with the polymer electrolyte or an exposed area thereof to the conducting material retaining portion can be obtained by, for example, TEM (transmission electron microscope) tomography besides the above-described method.

If necessary, the catalyst layer may contain additives of a water repellent such as polytetrafluoroethylene, polyhexafluoropropylene, and tetrafluoroethylene-hexafluoropropylene copolymer, a dispersant such as a surfactant, a thickener such as glycerin, ethylene glycol (EG), polyvinyl alcohol (PVA), and propylene glycol (PG), a pore-forming agent, or the like.

A thickness (as a dried thickness) of the catalyst layer is preferably in the range of 0.05 to 30 μm, more preferably in the range of 1 to 20 μm, even more preferably in the range of 2 to 15 μm. The thickness can be applied to both of the cathode catalyst layer and the anode catalyst layer. However, the thickness of the cathode catalyst layer and the thickness of the anode catalyst layer may be equal to or different from each other.

(Method of Manufacturing Catalyst Layer)

Hereinafter, a method for manufacturing the catalyst layer will be described as an exemplary embodiment, but the scope of the present invention is not limited to the following embodiment. In addition, all the conditions for the components and the materials of the catalyst layer are as described above, and thus, the description thereof is omitted.

First, a carbon powder as a support (in this description, also referred to as a "porous support" or a "conductive porous support") is prepared. Specifically, the support may be produced as described above in the method of producing the carbon powder.

Next, the catalyst is supported on the porous support, so that a catalyst powder is prepared. The supporting of the catalyst on the porous support can be performed by a well-known method. For example, a well-known method such as an impregnation method, a liquid phase reduction supporting method, an evaporation drying method, a colloid adsorption method, a spray pyrolysis method, or reverse micelle (micro-emulsion method) may be used.

Subsequently, a catalyst ink containing the catalyst powder, polymer electrolyte, and a solvent is prepared. As the solvent, there is no particular limitation. A typical solvent used for forming a catalyst layer may be similarly used. Specifically, water such as tap water, pure water, ion-exchanged water, distilled water, cyclohexanol, a lower alcohol having 1 to 4 carbons such as methanol, ethanol, n-propanol, isopropanol, n-butanol, sec-butanol, isobutanol, and tert-butanol, propylene glycol, benzene, toluene, xylene, or the like may be used. Besides, acetic acid butyl alcohol, dimethyl ether, ethylene glycol, or the like may be used as a solvent. These solvents may be used alone or may be used in a state of a mixture of two or more solvents.

An amount of solvent for preparing the catalyst ink is not particularly limited so long as the electrolyte can be completely dissolved. Specifically, a concentration (a solid content) of the catalyst powder and the polymer electrolyte is preferably in the range of 1 to 50 wt % in the electrode catalyst ink, more preferably in the range of about 5 to 30 wt %.

In the case of using an additive such as a water repellent, a dispersant, a thickener, and a pore-forming agent, the additive may be added to the catalyst ink. In this case, an added amount of the additive is not particularly limited so long as it does not interfere with the above-described effects by the present invention. For example, the added amount of the additive is preferably in the range of 5 to 20 wt %, with respect to the total weight of the electrode catalyst ink.

Next, a surface of a substrate is coated with the catalyst ink. A method of coating the substrate is not particularly limited, but a well-known method may be used. Specifically, a well-known method such as a spray (spray coat) method, a Gulliver printing method, a die coater method, a screen printing method, or a doctor blade method can be used.

As the substrate coated with the catalyst ink, a solid polymer electrolyte membrane (electrolyte layer) or a gas diffusion substrate (gas diffusion layer) may be used. In this case, after the catalyst layer is formed on a surface of a solid polymer electrolyte membrane (electrolyte layer) or a gas diffusion substrate (gas diffusion layer), the resultant laminate may be used as it is for manufacturing a membrane electrode assembly. Alternatively, as the substrate, a peelable substrate such as a polytetrafluoroethylene (PTFE) [Teflon (registered trademark)] sheet can be used, and after a catalyst layer is formed on the substrate, the catalyst layer portion can be peeled off from the substrate, so that the catalyst layer may be obtained.

Finally, the coat layer (film) of the catalyst ink is dried under an air ambience or under an inert gas ambience at a temperature ranging from room temperature to 150° C. for a time ranging from 1 to 60 minutes. By this, the catalyst layer can be formed.

(Membrane Electrode Assembly/Fuel Cell)

According to another embodiment of the present invention, provided is a membrane electrode assembly for fuel cell including the above-described electrode catalyst layer for fuel cell and a fuel cell including the membrane electrode assembly for fuel cell. That is, provided is a membrane electrode assembly for fuel cell which includes a solid polymer electrolyte membrane 2, a cathode catalyst layer disposed at one side of the electrolyte membrane, an anode catalyst layer disposed at the other side of the electrolyte membrane, and a pair of gas diffusion layers (4a, 4c) interposing the electrolyte membrane 2, the anode catalyst layer 3a, and the cathode catalyst layer 3c. In the membrane electrode assembly, at least one of the cathode catalyst layer and the anode catalyst layer is the catalyst layer according to the embodiment described above.

However, by taking into consideration necessity of improved proton conductivity and improved transport characteristic (gas diffusibility) of a reaction gas (particularly, $O_2$), at least the cathode catalyst layer is preferably the catalyst layer according to the embodiment described above. However, the catalyst layer according to the embodiment is not particularly limited. The catalyst layer may be used as the anode catalyst layer or may be used as the cathode catalyst layer and the anode catalyst layer.

According to further embodiment of the present invention, provided is a fuel cell including the membrane electrode assembly according to the embodiment. Namely, according to one aspect, the present invention provides a fuel cell comprising a pair of anode separator and cathode separator interposing the membrane electrode assembly according to the embodiment.

Hereinafter, members of a PEFC 1 using the catalyst layer according to the embodiment will be described with reference to FIG. 1. However, the present invention has features with respect to the catalyst layer. Therefore, among members constituting the fuel cell, specific forms of members other than the catalyst layer may be appropriately modified with reference to well-known knowledge in the art.

(Electrolyte Membrane)

An electrolyte membrane is configured with a solid polymer electrolyte membrane 2 in the same form illustrated in, for example, FIG. 1. The solid polymer electrolyte membrane 2 serves to selectively transmit protons generated in an anode catalyst layer 3*a* to a cathode catalyst layer 3*c* in the thickness direction during the operation of the PEFC 1. In addition, the solid polymer electrolyte membrane 2 also serves as a partition wall for preventing a fuel gas supplied to an anode side from being mixed with an oxidant gas supplied to a cathode side.

An electrolyte material constituting the solid polymer electrolyte membrane 2 is not particularly limited, but well-known knowledge in the art may be appropriately referred to. For example, the fluorine-based polymer electrolyte or the hydrocarbon-based polymer electrolyte described above as the polymer electrolyte can be used. There is no need to use the polymer electrolyte which is necessarily the same as the polymer electrolyte used for the catalyst layer.

A thickness of the electrolyte layer is not particularly limited, but it may be determined by taking into consideration characteristics of the obtained fuel cell. The thickness of the electrolyte layer is typically in the range of about 5 to 300 μm. If the thickness of the electrolyte layer is within such a range, balance between strength during the film formation or durability during the use and output characteristics during the use can be appropriately controlled.

(Gas Diffusion Layer)

A gas diffusion layer (anode gas diffusion layer 4*a*, cathode gas diffusion layer 4*c*) serves to facilitate diffusion of a gas (fuel gas or oxidant gas) supplied through a gas passage (6*a*, 6*c*) of a separator to a catalyst layer (3*a*, 3*c*) and also serves as an electron conducting path.

A material constituting a substrate of the gas diffusion layers (4*a*, 4*c*) is not particularly limited, but well-known knowledge in the related art may be appropriately referred to. For example, a sheet-shaped material having conductivity and porous property such as a fabric made of carbon, a sheet-shaped paper, felt, and a nonwoven fabric may be exemplified. A thickness of the substrate may be appropriately determined by considering characteristics of the obtained gas diffusion layer. The thickness of the substrate may be in the range of about 30 to 500 μm. If the thickness of the substrate is within such a range, balance between mechanical strength and diffusibility of gas, water, and the like can be appropriately controlled.

The gas diffusion layer preferably includes a water repellent for the purpose of preventing a flooding phenomenon or the like by improving water repellent property. The water repellent is not particularly limited, but fluorine-based polymer materials such as polytetrafluoroethylene (PTFE), polyvinylidene fluoride (PVdF), polyhexafluoropropylene, and tetrafluoroethylene-hexafluoropropylene copolymer (FEP), polypropylene, polyethylene, and the like may be exemplified.

In order to further improve water repellent property, the gas diffusion layer may include a carbon particle layer (microporous layer (MPL), not shown) configured with an assembly of carbon particles including a water repellent provided at the catalyst-layer side of the substrate.

Carbon particles included in the carbon particle layer are not particularly limited, but well-known materials in the art such as carbon black, graphite, and expandable graphite may be appropriately employed. Among the materials, due to excellent electron conductivity and a large specific surface area, carbon black such as oil furnace black, channel black, lamp black, thermal black, and acetylene black can be preferably used. An average particle diameter of the carbon particles may be set to be in the range of about 10 to 100 nm. By this, high water-repellent property by a capillary force can be obtained, and contacting property with the catalyst layer can be improved.

As the water repellent used for the carbon particle layer, the above-described water repellent may be exemplified. Among the materials, due to excellent water repellent property and excellent corrosion resistance during the electrode reaction, the fluorine-based polymer material can be preferably used.

A mixing ratio of the carbon particles and the water repellent in the carbon particle layer may be set to be in the range of weight ratio of about 90:10 to 40:60 (carbon particle:water repellent) by taking into consideration balance between water repellent property and electron conductivity. Meanwhile, a thickness of the carbon particle layer is not particularly limited, but it may be appropriately determined by taking into consideration water repellent property of the obtained gas diffusion layer.

(Method of Manufacturing Membrane Electrode Assembly)

A method of manufacturing a membrane electrode assembly is not particularly limited, and a well-known method in the art may be used. For example, a method which comprises transferring a catalyst layer to a solid polymer electrolyte membrane by using a hot press, or coating a solid polymer electrolyte membrane with a catalyst layer and drying the coating, and joining the resulting laminate with gas diffusion layers, or a method which comprises coating a microporous layer (in the case of not including a microporous layer, one surface of a substrate layer) of a gas diffusion layer with a catalyst layer in advance and drying the resulting product to produce two gas diffusion electrodes (GDEs), and joining both surfaces of the solid polymer electrolyte membrane with the two gas diffusion electrodes by using a hot press can be used. The coating and joining conditions by hot press and the like may be appropriately adjusted according to a type of the polymer electrolyte (perfluorosulfonic acid-based or hydrocarbon-based) in the solid polymer electrolyte membrane or the catalyst layer.

(Separator)

In the case of configuring a fuel cell stack by connecting a plurality of unit fuel cells of polymer electrolyte fuel cells in series, a separator serves to electrically connect the cells in series. The separator also serves as a partition wall for separating a fuel gas, an oxidant gas, and a coolant from each other. In order to secure a passage thereof, as described above, gas passages and coolant passages are preferably installed in each of the separators. As a material constituting the separator, well-known materials in the art of carbon such as dense carbon graphite and a carbon plate, a metal such as a stainless steel, or the like can be employed without limitation. A thickness or size of the separator, a shape or size of the installed passages, and the like are not particularly limited, but they can be appropriately determined by taking into consideration desired output characteristics and the like of the obtained fuel cell.

A manufacturing method for the fuel cell is not particularly limited, and well-known knowledge in the art in the field of fuel cell may be appropriately referred to.

Furthermore, in order that the fuel cell can generate a desired voltage, a fuel cell stack may be formed by connecting a plurality of membrane electrode assemblies in series through a separator. A shape and the like of the fuel cell are not particularly limited, and they may be appropriately determined so as to obtain desired cell characteristics such as a voltage.

The above-described PEFC or membrane electrode assembly uses the catalyst layer having excellent power generation performance and excellent durability. Therefore, the PEFC or membrane electrode assembly shows excellent power generation performance and durability.

The PEFC according to the embodiment and the fuel cell stack using the PEFC can be mounted on a vehicle, for example, as a driving power source.

EXAMPLE

The effects of the present invention will be described with reference to the following Examples and Comparative Examples. However, the scope of the present invention is not limited to the Examples.

Example 1

A carbon material A which had a pore volume of micropores of 1.04 cc/g; a pore volume of mesopores of 0.92 cc/g; a mode diameter of micropores of 0.65 nm; a mode diameter of mesopores of 1.2 nm; and a BET specific surface area of 1770 $m^2$/g was prepared as below. Specifically, the carbon material A was prepared by a method disclosed in WO 2009/75264 A.

Next, the resultant carbon material A was heated to 1700° C. at a temperature rising rate of 500° C./h under an argon atmosphere and was then held at this temperature for five minutes, to prepare a support A having a BET specific surface area of 1378 $m^2$/g. An R value and an R' value of the support A were measured to be 1.99 and 0.42, respectively. In addition, the resultant support A was measure for an average particle size (diameter), pore volumes of micropores and mesopores, mode diameters of micropores and mesopores, and a BET specific surface area. As a result, it was found that for the support A, an average particle size (diameter) was 91.5 nm, a pore volume of micropores was 0.43 cc/g-support, a pore volume of mesopores was 0.69 cc/g-support, a mode diameter of the micropores was 0.66 nm, a mode diameter of the mesopores was 2.8 nm, and a BET specific surface area was 1378 $m^2$/g.

Example 2

A carbon material A was prepared in the same manner as in Synthesis Example 1.

Next, the resultant carbon material A was heated to 1600° C. at a temperature rising rate of 500° C./h under an argon atmosphere and was then held at this temperature for five minutes, to prepare a support B having a BET specific surface area of 1522 $m^2$/g. An R value and an R' value of the support B were measured to be 1.81 and 0.50, respectively. In addition, the resultant support B was measure for an average particle size (diameter), pore volumes of micropores and mesopores, mode diameters of micropores and mesopores, and a BET specific surface area. As a result, it was found that for the support B, an average particle size (diameter) was 89 nm, a pore volume of micropores was 0.73 cc/g-support, a pore volume of mesopores was 1.17 cc/g-support, a mode diameter of the micropores was 0.73 nm, a mode diameter of the mesopores was 2.4 nm, and a BET specific surface area was 1522 $m^2$/g.

Comparative Example 1

A carbon material A was prepared in the same manner as in Synthesis Example 1.

Next, an R value and an R' value of a support C using the carbon material A were measured to be 1.64 and 0.61, respectively. In addition, the resultant support C was measure for an average particle size (diameter), pore volumes of micropores and mesopores, mode diameters of micropores and mesopores, and a BET specific surface area. As a result, it was found that for the support C, an average particle size (diameter) was 91.5 nm, a pore volume of micropores was 1.04 cc/g-support, a pore volume of mesopores was 1.23 cc/g-support, a mode diameter of the micropores was 0.65 nm, a mode diameter of the mesopores was 2.1 nm, and a BET specific surface area was 1768 $m^2$/g.

Comparative Example 2

A carbon material A was prepared in the same manner as in Synthesis Example 1.

Next, the resultant carbon material A was heated to 1300° C. at a temperature rising rate of 500° C./h under an argon atmosphere and was then held at this temperature for five minutes, to prepare a support D. An R value and an R' value of the support D were measured to be 1.75 and 0.66, respectively. In addition, the resultant support D was measure for an average particle size (diameter), pore volumes of micropores and mesopores, mode diameters of micropores and mesopores, and a BET specific surface area were measured. As a result, it was found that for the support D, an average particle size (diameter) was 91.5 nm, a pore volume of micropores was 1.06 cc/g-support, a pore volume of mesopores was 1.21 cc/g-support, a mode diameter of the micropores was 0.66 nm, a mode diameter of the mesopores was 2.1 nm, and a BET specific surface area was 1768 $m^2$/g.

Comparative Example 3

Ketjen Black (EC300J) (having a BET specific surface area of 715 $m^2$/g) was used as a support E. An R value and an R' value of the support E were measured to be 1.78 and 0.74, respectively. In addition, the support resultant E was measure for an average particle size (diameter), pore volumes of micropores and mesopores, mode diameters of micropores and mesopores, and a BET specific surface area. As a result, it was found that for the support E, an average particle size (diameter) was 53 nm, a pore volume of micropores was 0.35 cc/g-support, a pore volume of mesopores was 0.49 cc/g-support, a mode diameter of the micropores was 0.45 nm, a mode diameter of the mesopores was 2.2 nm, and a BET specific surface area was 715 $m^2$/g.

Experiment 1: Evaluation of Platinum Coating

A platinum specific surface area (COMSA) was measured using CO adsorption method when platinum was supported on the supports A and B of the present invention produced in Examples 1 and 2 described above and the support E produced in Comparative Example 3 at a ratio of 50 wt % relative to the weight of the support. The result is illustrated in FIG. 4.

Figure 4:
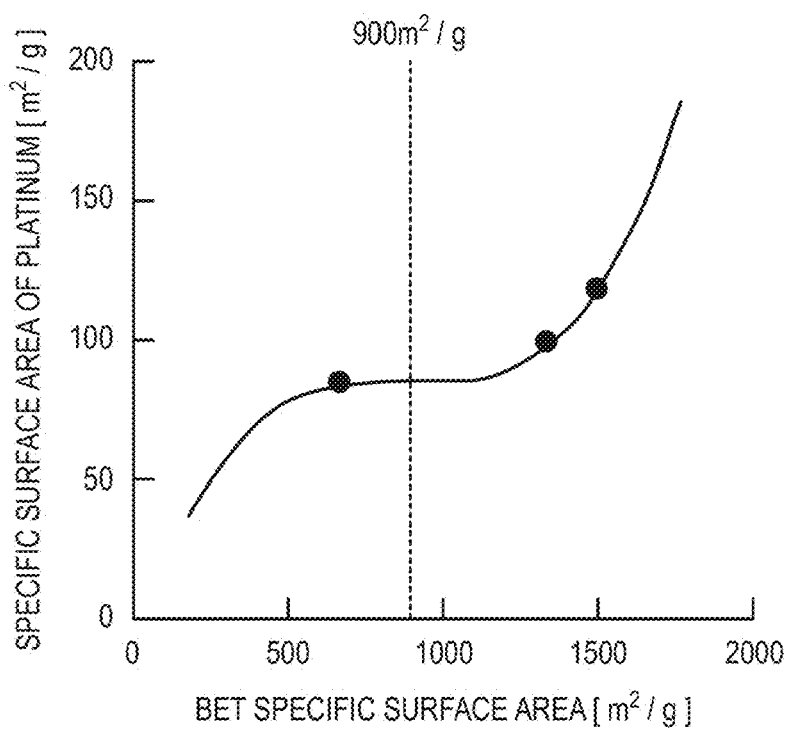
FIG. 4 is a graph illustrating an evaluation result of platinum coating of supports A and B produced in Examples 1 and 2 and a support E produced in Comparative Example 3, in Experiment 1.

It is noted from FIG. 4 that the supports (carbon powders) A and B having BET specific surface area of 900 m$^2$/g or more have a significantly larger platinum specific surface area as compared to that of the support E having BET specific surface area deviated from the range of the present invention. From this, it is considered that the electrical double layer capacitance of the catalyst can be significantly improved by using the carbon powder of the present invention as a support.

Example 3

The support A manufactured in the Example 1 was used, and platinum (Pt) having an average particle diameter of more than 3 nm and 5 nm or less as a catalyst metal was supported on the support A at a support ratio of 30 wt %, to prepare a catalyst powder A. To be specific, 46 g of the support A was immersed into 1000 g of a dinitrodiammine platinum nitric acid solution having a platinum concentration of 4.6 wt % (platinum content: 46 g), and after stirring, 100 mL of 100% of ethanol as a reducing agent was added thereto. The resultant mixture was stirred and mixed at a boiling point for 7 hours, so that platinum was supported on the support A. Next, by filtering and drying, the catalyst powder having a support ratio of 30 wt % was obtained. After that, the resulting product was maintained in a hydrogen atmosphere at a temperature of 900° C. for 1 hour, to yield a catalyst powder A.

Example 4

A catalyst powder B was obtained by the same processes as those of Example 3, except that the support B manufactured in the Example 2 was used instead of the support A in Example 3.

Comparative Example 4

A catalyst powder C was obtained by the same processes as those of Example 3, except that the support C manufactured in the Comparative Example 1 was used instead of the support A in Example 3.

Comparative Example 5

A catalyst powder D was obtained by the same processes as those of Example 3, except that the support D manufactured in the Comparative Example 2 was used instead of the support A in Example 3.

Experiment 2: Evaluation of Durability

The catalyst powders A and B produced in Examples 3 and 4 and the catalyst powders C and D produced in Comparative Examples 4 and 5 were evaluated for durability according to the following method. The results are indicated in Table 1 below.

To be specific, using a three-electrode type electrochemical cell, an electrochemical system "HZ-5000+HR301" manufactured by a Hokuto Denko Corporation was used as a potentiostat. By using a glassy carbon rotary electrode (GC-RDE) (φ (diameter)=5 mm) as a working electrode, an ink obtained by dispersing each catalyst powder produced in Examples and Comparative Examples in a mixed solvent of water and 1-propanol serving as a dispersion medium was coated thereon and dried so as to give a dry film thickness of 1 μm, to produce an electrode. Carbon was used as a counter electrode, and a reversible hydrogen electrode (RHE) was used as reference electrode. 0.1 M of perchloric acid as an electrolyte was saturated with $O_2$. The measurement was performed at 60° C.

An effective catalyst surface area (ECA) was calculated by a cyclic voltammetry (CV). Potential scanning was performed at 1.0 V for 30 seconds before measurement. Thereafter, the potential range of from 1.0 to 1.5 V rose (for one second) and descended (for one second) at a potential sweep rate of 0.5 V/s, and this process was referred to as one cycle (2 seconds/cycle). When this potential cycle was repeated, a peak potential of a quinine-hydroquinone reduction current in the vicinity of 0.6 V measured by a cyclic voltammetry method was shifted to a low potential side with an increase in the potential cycle. From the change in reduction current, a carbon state and a change of the electrical double layer capacitance were estimated. Specifically, the number of cycles to be repeated until the potential of the reduction current became 0.5 V or less was used as an index of durability.

TABLE 1

| | Catalyst powder | R' value | R value | Number of cycles until peak potential of reduction current becomes 0.5 V or less |
|---|---|---|---|---|
| Example 3 | A | 0.42 | 1.99 | 3766 |
| Example 4 | B | 0.50 | 1.81 | 1724 |
| Comparative Example 4 | C | 0.61 | 1.64 | 1350 |
| Comparative Example 5 | D | 0.66 | 1.75 | 778 |

It is noted from the results in Table 1 that the numbers of cycles to decrease the reduction current appeared in the catalyst powders A and B prepared in Examples 3 and 4 are larger than those appeared in the catalyst powders C and D prepared in Comparative Examples 4 and 5. From this, it is considered that the catalyst using the carbon powder of the present invention has small decrease in electrical double layer capacitance, and can maintain significantly high activity (excellent in durability).

Example 5

A catalyst powder E was obtained by the same processes as those of Example 3, except that platinum (Pt) was supported on the support A at a support ratio of 50 wt % in Example 3.

Comparative Example 6

A catalyst powder F was obtained by the same processes as those of Example 5, except that the support C manufactured in the Comparative Example 1 was used instead of the support A in Example 5.

Example 6

The catalyst powder E manufactured in Example 5 and an ionomer dispersion liquid (Nafion (registered trademark) D2020, EW=1100 g/mol, produced by DuPont) as a polymer electrolyte were mixed at a weight ratio of the carbon support and the ionomer of 0.9. Next, a cathode catalyst ink was prepared by adding a n-propyl alcohol solution (50%) as a solvent with a solid content (Pt+carbon support+ionomer) of 7 wt %.

Ketjen Black (particle diameter: 30 to 60 nm) was used as the support, and platinum (Pt) having an average particle diameter of 2.5 nm as the catalyst metal was supported thereon at a support ratio of 50 wt %, to obtain a catalyst powder. The catalyst powder and an ionomer dispersion liquid (Nafion (registered trademark) D2020, EW=1100 g/mol, produced by DuPont) as the polymer electrolyte were mixed at a weight ratio of the carbon support and the ionomer of 0.9. Next, an anode catalyst ink was prepared by adding a n-propyl alcohol solution (50%) as a solvent with a solid content (Pt+carbon support+ionomer) of 7 wt %.

Next, a gasket (Teonex produced by Teijin DuPont, thickness: 25 μm (adhesive layer: 10 μm)) was arranged around both surfaces of a polymer electrolyte membrane (NAFION NR211 produced by DuPont, thickness: 25 μm). Then, an exposed portion of one surface of the polymer electrolyte membrane was coated with the cathode catalyst ink having a size of 5 cm×2 cm by a spray coating method. The catalyst ink was dried by maintaining the stage where the spray coating was performed at a temperature of 60° C. for 1 minute, to obtain a cathode catalyst layer. At this time, a supported amount of platinum is 0.15 mg/cm$^2$. Next, similarly to the cathode catalyst layer, an anode catalyst layer was formed by spray coating and heat-treatment on the electrolyte membrane.

The resultant laminate were sandwiched by gas diffusion layers (24BC, manufactured by SGL Group-The Carbon Company), to obtain a membrane electrode assembly (1) (MEA (1)).

Comparative Example 7

A membrane electrode assembly (2) (MEA (2)) was manufactured by the same processes as those of Example 6, except that the catalyst powder F obtained in Comparative Example 6 was used instead of the catalyst powder E in Example 6.

Experiment 3: Evaluation of Power Generation Performance

Figure 5:
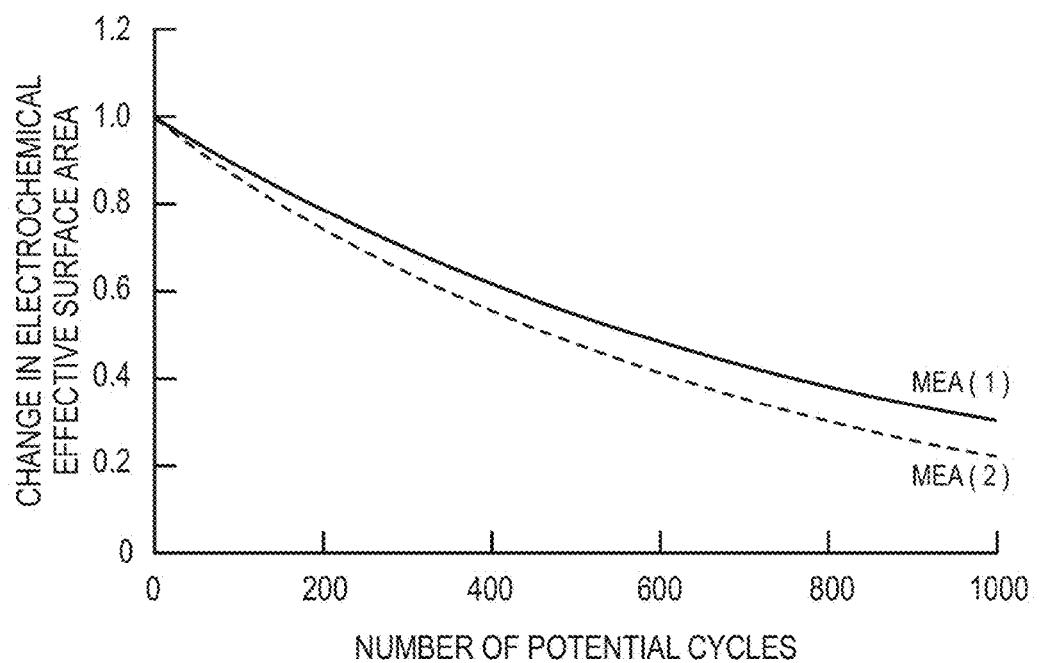
FIG. 5 is a graph illustrating an evaluation result of power generation performance of MEA (1) produced in Example 6 and MEA (2) produced in Comparative Example 7, in Experiment 3.

A single cell of a fuel cell was configured using the MEA (1) produced in Example 6 described above and the MEA (2) produced in Comparative Example 7, respectively, and evaluated for power generation performance (durability) according to the following method. The result is illustrated in FIG. 5.

First, the single cell of the fuel cell was controlled at a temperature of 80° C., a hydrogen gas and nitrogen were supplied to an anode side and a cathode side of the fuel cell, respectively, and an exhaust-side pressure of the fuel cell was set to be an atmospheric pressure.

An external load was controlled for three seconds in this state at an operation voltage of the single cell of 0.6 V, and then the external load was controlled for three seconds at an operation voltage of 0.9 V.

Then, the single cell was operated by the same control of operation temperature and operation voltage of the single cell was repeated with 1000 cycles.

Before and after the load cycle operation of the fuel cell, an electrochemical surface area (ECA) of a cathode catalyst layer was calculated from an area of a reduction current corresponding to hydrogen generation measured by a cyclic voltammetry method. By setting an initial electrochemical surface area to be 1, decrease in electrochemical surface area due to potential cycles was determined, to evaluate durability of the fuel cell depending on a change in the effective surface area.

It is noted from the result illustrated in FIG. 5 that the MEA (1) of Example 6 has smaller decrease in electrochemical surface area than that of the MEA (2) of Comparative Example 7. From this, it is considered that the membrane electrode assembly using the catalyst formed using the carbon powder of the present invention can exhibit and maintain high power generation performance.

The present application is based on the Japanese Patent application No. 2013-204163 filed on Sep. 30, 2013, the entire disclosed contents of which are incorporated herein by reference.

The invention claimed is:

1. A catalyst having a catalyst metal supported on a carbon powder for catalyst, the carbon powder containing as a main component carbon and comprising:
   a BET specific surface area per unit weight of 900 m$^2$/g or greater;
   a ratio R' (D'/G intensity ratio) of peak intensity for a D'-band (D' intensity) measured in the vicinity of 1620 cm$^{-1}$ to peak intensity for a G-band (G intensity) measured in the vicinity of 1580 cm$^{-1}$ by Raman spectroscopy of 0.6 or less; and
   a ratio R (D/G intensity ratio) of peak intensity for a D-band (D intensity) measured in the vicinity of 1360 cm$^{-1}$ to the peak intensity for the G-band (G intensity) measured in the vicinity of 1580 cm$^{-1}$ by Raman spectroscopy is 1.7 or more,
   wherein the carbon powder contains micropores having a radius of less than 1 nm and mesopores having a radius of 1 nm or more, and
   wherein at least a portion of the catalyst metal is supported inside the mesopores.

2. The catalyst according to claim 1, wherein the catalyst metal is platinum or comprises platinum and at least one of ruthenium, iridium, rhodium, palladium, osmium, tungsten, lead, iron, copper, silver, chromium, cobalt, nickel, manganese, vanadium, molybdenum, gallium, or aluminum.

3. An electrode catalyst layer for fuel cell comprising the catalyst according to claim 1 and an electrolyte.

4. A membrane electrode assembly for fuel cell comprising the electrode catalyst layer for fuel cell according to claim 3.

5. A fuel cell comprising the membrane electrode assembly for fuel cell according to claim 4.

6. An electrode catalyst layer for fuel cell comprising the catalyst according to claim 2 and an electrolyte.

7. The catalyst according to claim 1, wherein a pore volume of the micropores is 0.3 cc/g-carbon powder or more.

8. The catalyst according to claim 1, wherein a mode radius of pore distribution of micropores is 0.3 nm or more and less than 1 nm.

9. The catalyst according to claim 1, wherein the ratio R (D/G intensity ratio) of peak intensity for a D-band (D intensity) measured in the vicinity of 1360 cm$^{-1}$ to the peak intensity for the G-band (G intensity) measured in the vicinity of 1580 cm$^{-1}$ by Raman spectroscopy is 1.7 or more and 2.5 or less.

* * * * *